(12) United States Patent
Kennis

(10) Patent No.: US 7,574,740 B1
(45) Date of Patent: Aug. 11, 2009

(54) METHOD AND SYSTEM FOR INTRUSION DETECTION IN A COMPUTER NETWORK

(75) Inventor: Peter H. Kennis, Marietta, GA (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/561,588

(22) Filed: Apr. 28, 2000

(51) Int. Cl.
G06F 12/14 (2006.01)
G06F 17/00 (2006.01)
H04L 9/00 (2006.01)

(52) U.S. Cl. .............. 726/22; 726/11; 726/13; 726/23; 726/25; 713/151; 713/168

(58) Field of Classification Search ............... 713/201; 709/224
See application file for complete search history.

(56) References Cited

U.S. PATENT DOCUMENTS

| | | | |
|---|---|---|---|
| 4,223,380 A | 9/1980 | Antonaccio et al. |
| 4,400,769 A | 8/1983 | Kaneda et al. |
| 4,672,609 A | 6/1987 | Humphrey et al. |
| 4,773,028 A | 9/1988 | Tallman |
| 4,819,234 A | 4/1989 | Huber |
| 4,975,950 A | 12/1990 | Lentz |
| 5,032,979 A | 7/1991 | Hecht et al. |
| 5,121,345 A | 6/1992 | Lentz |
| 5,204,966 A | 4/1993 | Wittenberg et al. |
| 5,210,704 A | 5/1993 | Husseiny |
| 5,274,824 A | 12/1993 | Howarth |
| 5,278,901 A | 1/1994 | Shieh et al. |
| 5,309,562 A | 5/1994 | Li |
| 5,311,593 A | 5/1994 | Carmi |
| 5,345,595 A | 9/1994 | Johnson et al. |
| 5,347,450 A | 9/1994 | Nugent |

(Continued)

FOREIGN PATENT DOCUMENTS

EP 0 985 995 A1 3/2000

(Continued)

OTHER PUBLICATIONS

Herringshaw, C., Detecting Attacks on Networks, 1997, IEEE, pp. 16-17.*

(Continued)

Primary Examiner—Ayaz Sheikh
Assistant Examiner—Aravind K Moorthy
(74) Attorney, Agent, or Firm—King & Spalding LLP

(57) ABSTRACT

An intrusion detection system for detecting intrusion events in a computer network and assessing the vulnerability of the network components to the detected events. The intrusion detection system comprises a scanner, one or more sensors and a security console for operation within a networked computing environment. A sensor of the inventive intrusion detection system can monitor the networked computing environment for possible intrusion events representing an unauthorized access or use of the network resources. In response to detecting an intrusion event, the sensor can generate a scan request for handling by a scanner. This request initiates a scan of the target computer by the scanner to determine the vulnerability of the target to the attack. Based on this vulnerability analysis, the inventive intrusion detection system can evaluate the severity of the detected intrusion event and issue an alert having a priority corresponding to the severity of the intrusion.

17 Claims, 8 Drawing Sheets

U.S. PATENT DOCUMENTS

| | | |
|---|---|---|
| 5,353,393 A | 10/1994 | Bennett et al. |
| 5,359,659 A | 10/1994 | Rosenthal |
| 5,371,852 A | 12/1994 | Attanasio et al. |
| 5,398,196 A | 3/1995 | Chambers |
| 5,414,833 A | 5/1995 | Hershey et al. |
| 5,440,723 A | 8/1995 | Arnold et al. |
| 5,452,442 A | 9/1995 | Kephart |
| 5,454,074 A | 9/1995 | Hartel et al. |
| 5,475,839 A | 12/1995 | Watson et al. |
| 5,511,184 A | 4/1996 | Lin |
| 5,515,508 A | 5/1996 | Pettus et al. |
| 5,522,026 A | 5/1996 | Records et al. |
| 5,539,659 A | 7/1996 | McKee et al. |
| 5,557,742 A | 9/1996 | Smaha et al. |
| 5,586,260 A | 12/1996 | Hu |
| 5,590,331 A | 12/1996 | Lewis et al. |
| 5,606,668 A | 2/1997 | Shwed |
| 5,623,600 A | 4/1997 | Ji et al. |
| 5,623,601 A | 4/1997 | Vu |
| 5,630,061 A | 5/1997 | Richter et al. |
| 5,649,095 A | 7/1997 | Cozza |
| 5,649,185 A | 7/1997 | Antognini et al. |
| 5,675,711 A | 10/1997 | Kephart et al. |
| 5,696,486 A | 12/1997 | Poliquin et al. |
| 5,696,822 A | 12/1997 | Nachenberg |
| 5,706,210 A | 1/1998 | Kumano et al. |
| 5,734,697 A | 3/1998 | Jabbarnezhad |
| 5,745,692 A | 4/1998 | Lohmann, II et al. |
| 5,748,098 A | 5/1998 | Grace |
| 5,761,504 A | 6/1998 | Corrigan et al. |
| 5,764,887 A | 6/1998 | Kells et al. |
| 5,764,890 A | 6/1998 | Glasser et al. |
| 5,765,030 A | 6/1998 | Nachenberg et al. |
| 5,774,727 A | 6/1998 | Walsh et al. |
| 5,787,177 A | 7/1998 | Leppek |
| 5,790,799 A | 8/1998 | Mogul |
| 5,796,942 A | 8/1998 | Esbensen |
| 5,798,706 A | 8/1998 | Kraemer et al. |
| 5,812,763 A | 9/1998 | Teng |
| 5,815,574 A | 9/1998 | Fortinsky |
| 5,822,517 A | 10/1998 | Dotan |
| 5,826,013 A | 10/1998 | Nachenberg |
| 5,828,833 A | 10/1998 | Belville et al. |
| 5,832,208 A | 11/1998 | Chen et al. |
| 5,832,211 A | 11/1998 | Blakley, III et al. |
| 5,835,726 A | 11/1998 | Shwed et al. |
| 5,838,903 A | 11/1998 | Blakely, III et al. |
| 5,842,002 A | 11/1998 | Schnurer et al. |
| 5,845,067 A | 12/1998 | Porter et al. |
| 5,848,233 A | 12/1998 | Radia et al. |
| 5,854,916 A | 12/1998 | Nachenberg |
| 5,857,191 A | 1/1999 | Blackwell, Jr. et al. |
| 5,864,665 A | 1/1999 | Tran |
| 5,864,803 A | 1/1999 | Nussbaum |
| 5,872,978 A | 2/1999 | Hoskins |
| 5,875,296 A | 2/1999 | Shi et al. |
| 5,878,420 A | 3/1999 | de la Salle |
| 5,881,236 A | 3/1999 | Dickey |
| 5,884,033 A | 3/1999 | Duvall et al. |
| 5,892,903 A | 4/1999 | Klaus |
| 5,899,999 A | 5/1999 | De Bonet |
| 5,907,834 A | 5/1999 | Kephart et al. |
| 5,919,257 A | 7/1999 | Trostle |
| 5,919,258 A | 7/1999 | Kayashima et al. |
| 5,922,051 A | 7/1999 | Sidey |
| 5,925,126 A | 7/1999 | Hsieh |
| 5,931,946 A | 8/1999 | Terada et al. |
| 5,940,591 A | 8/1999 | Boyle et al. |
| 5,950,012 A | 9/1999 | Shiell et al. |
| 5,961,644 A | 10/1999 | Kurtzberg et al. |
| 5,964,839 A | 10/1999 | Johnson et al. |
| 5,964,889 A | 10/1999 | Nachenberg |
| 5,974,237 A | 10/1999 | Shurmer et al. |
| 5,974,457 A | 10/1999 | Waclawsky et al. |
| 5,978,917 A | 11/1999 | Chi |
| 5,983,270 A | 11/1999 | Abraham et al. |
| 5,983,348 A | 11/1999 | Ji |
| 5,983,350 A | 11/1999 | Minear et al. |
| 5,987,606 A | 11/1999 | Cirasole et al. |
| 5,987,610 A | 11/1999 | Franczek et al. |
| 5,987,611 A | 11/1999 | Freund |
| 5,991,856 A | 11/1999 | Spilo et al. |
| 5,991,881 A * | 11/1999 | Conklin et al. ............... 713/201 |
| 5,999,711 A | 12/1999 | Misra et al. |
| 5,999,723 A | 12/1999 | Nachenberg |
| 6,003,132 A | 12/1999 | Mann |
| 6,006,016 A | 12/1999 | Faigon et al. |
| 6,009,467 A | 12/1999 | Ratcliff et al. |
| 6,014,645 A | 1/2000 | Cunningham |
| 6,016,553 A | 1/2000 | Schneider et al. |
| 6,021,510 A | 2/2000 | Nachenberg |
| 6,026,442 A | 2/2000 | Lewis et al. |
| 6,029,256 A | 2/2000 | Kouznetsov |
| 6,035,323 A | 3/2000 | Narayen et al. |
| 6,035,423 A | 3/2000 | Hodges et al. |
| 6,041,347 A | 3/2000 | Harsham et al. |
| 6,052,709 A | 4/2000 | Paul |
| 6,061,795 A | 5/2000 | Dircks et al. |
| 6,067,410 A | 5/2000 | Nachenberg |
| 6,070,190 A | 5/2000 | Reps et al. |
| 6,070,244 A | 5/2000 | Orchier et al. |
| 6,073,172 A | 6/2000 | Frailong et al. |
| 6,081,894 A | 6/2000 | Mann |
| 6,085,224 A | 7/2000 | Wagner |
| 6,088,803 A | 7/2000 | Tso et al. |
| 6,088,804 A | 7/2000 | Hill et al. |
| 6,092,194 A | 7/2000 | Touboul |
| 6,094,731 A | 7/2000 | Waldin et al. |
| 6,098,173 A | 8/2000 | Elgressy et al. |
| 6,104,783 A | 8/2000 | DeFino |
| 6,108,799 A | 8/2000 | Boulay et al. |
| 6,118,940 A | 9/2000 | Alexander, III et al. |
| 6,119,165 A | 9/2000 | Li et al. |
| 6,119,234 A | 9/2000 | Aziz et al. |
| 6,122,738 A | 9/2000 | Millard |
| 6,144,961 A | 11/2000 | de la Salle |
| 6,154,844 A | 11/2000 | Touboul et al. |
| 6,161,109 A | 12/2000 | Matamoros et al. |
| 6,167,520 A | 12/2000 | Touboul |
| 6,173,413 B1 | 1/2001 | Slaughter et al. |
| 6,185,689 B1 | 2/2001 | Todd, Sr. et al. |
| 6,195,687 B1 | 2/2001 | Greaves et al. |
| 6,199,181 B1 | 3/2001 | Rechef et al. |
| 6,205,552 B1 | 3/2001 | Fudge |
| 6,226,372 B1 | 5/2001 | Beebe et al. |
| 6,230,288 B1 | 5/2001 | Kuo et al. |
| 6,266,773 B1 | 7/2001 | Kisor et al. |
| 6,266,774 B1 | 7/2001 | Sampath et al. |
| 6,271,840 B1 | 8/2001 | Finseth et al. |
| 6,272,641 B1 | 8/2001 | Ji |
| 6,275,938 B1 | 8/2001 | Bond et al. |
| 6,275,942 B1 | 8/2001 | Bernhard et al. |
| 6,278,886 B1 | 8/2001 | Hwang |
| 6,279,113 B1 | 8/2001 | Vaidya |
| 6,282,546 B1 | 8/2001 | Gleichauf et al. |
| 6,298,445 B1 | 10/2001 | Shostack et al. |
| 6,301,668 B1 | 10/2001 | Gleichauf et al. |
| 6,314,520 B1 | 11/2001 | Schell et al. |
| 6,314,525 B1 | 11/2001 | Mahalingham et al. |
| 6,321,338 B1 | 11/2001 | Porras et al. |
| 6,324,627 B1 | 11/2001 | Kricheff et al. |
| 6,324,647 B1 | 11/2001 | Bowman-Amuah |
| 6,324,656 B1 | 11/2001 | Gleichauf et al. |
| 6,338,141 B1 | 1/2002 | Wells |

| | | |
|---|---|---|
| 6,347,374 B1 | 2/2002 | Drake et al. |
| 6,353,385 B1 * | 3/2002 | Molini et al. ............... 340/506 |
| 6,357,008 B1 | 3/2002 | Nachenberg |
| 6,377,994 B1 | 4/2002 | Ault et al. |
| 6,396,845 B1 | 5/2002 | Sugita |
| 6,397,242 B1 | 5/2002 | Devine et al. |
| 6,397,245 B1 | 5/2002 | Johnson, II et al. |
| 6,405,318 B1 | 6/2002 | Rowland |
| 6,405,364 B1 | 6/2002 | Bowman-Amuah |
| 6,408,391 B1 * | 6/2002 | Huff et al. ................. 713/201 |
| 6,415,321 B1 | 7/2002 | Gleichauf et al. |
| 6,429,952 B1 | 8/2002 | Olbricht |
| 6,434,615 B1 | 8/2002 | Dinh et al. |
| 6,438,600 B1 | 8/2002 | Greenfield et al. |
| 6,445,822 B1 | 9/2002 | Crill et al. |
| 6,453,345 B2 | 9/2002 | Trcka et al. |
| 6,453,346 B1 | 9/2002 | Garg et al. |
| 6,460,141 B1 | 10/2002 | Olden |
| 6,463,426 B1 | 10/2002 | Lipson et al. |
| 6,470,449 B1 | 10/2002 | Blandford |
| 6,477,585 B1 | 11/2002 | Cohen et al. |
| 6,477,648 B1 | 11/2002 | Schell et al. |
| 6,477,651 B1 | 11/2002 | Teal |
| 6,484,203 B1 | 11/2002 | Porras et al. |
| 6,487,666 B1 | 11/2002 | Shanklin et al. |
| 6,496,858 B1 | 12/2002 | Frailong et al. |
| 6,499,107 B1 | 12/2002 | Gleichauf et al. |
| 6,510,523 B1 | 1/2003 | Perlman et al. |
| 6,517,587 B2 | 2/2003 | Satyavolu et al. |
| 6,519,647 B1 | 2/2003 | Howard et al. |
| 6,519,703 B1 | 2/2003 | Joyce |
| 6,530,024 B1 | 3/2003 | Proctor |
| 6,535,227 B1 | 3/2003 | Fox et al. |
| 6,546,493 B1 | 4/2003 | Magdych et al. |
| 6,563,959 B1 | 5/2003 | Troyanker |
| 6,574,737 B1 | 6/2003 | Kingsford et al. |
| 6,578,147 B1 | 6/2003 | Shanklin et al. |
| 6,584,454 B1 | 6/2003 | Hummel, Jr. et al. |
| 6,601,190 B1 | 7/2003 | Meyer et al. |
| 6,606,744 B1 | 8/2003 | Mikurak |
| 6,618,501 B1 | 9/2003 | Osawa et al. |
| 6,628,824 B1 | 9/2003 | Belanger |
| 6,647,139 B1 | 11/2003 | Kunii et al. |
| 6,647,400 B1 | 11/2003 | Moran |
| 6,661,904 B1 | 12/2003 | Sasich et al. |
| 6,668,082 B1 | 12/2003 | Davison et al. |
| 6,668,084 B1 | 12/2003 | Minami |
| 6,681,331 B1 * | 1/2004 | Munson et al. ............. 713/201 |
| 6,691,232 B1 | 2/2004 | Wood et al. |
| 6,704,874 B1 | 3/2004 | Porras et al. |
| 6,708,212 B2 | 3/2004 | Porras et al. |
| 6,711,127 B1 * | 3/2004 | Gorman et al. ............. 370/230 |
| 6,711,615 B2 | 3/2004 | Porras et al. |
| 6,718,383 B1 | 4/2004 | Hebert |
| 6,721,806 B2 | 4/2004 | Boyd et al. |
| 6,725,377 B1 * | 4/2004 | Kouznetsov ................ 713/201 |
| 6,725,378 B1 | 4/2004 | Schuba et al. |
| 6,775,780 B1 | 8/2004 | Muttik |
| 6,792,144 B1 | 9/2004 | Yan et al. |
| 6,792,546 B1 * | 9/2004 | Shanklin et al. ............. 713/201 |
| 6,816,973 B1 | 11/2004 | Gleichauf et al. |
| 6,839,850 B1 | 1/2005 | Campbell et al. |
| 6,886,102 B1 * | 4/2005 | Lyle ........................... 713/201 |
| 6,954,775 B1 * | 10/2005 | Shanklin et al. ............. 718/105 |
| 6,990,591 B1 * | 1/2006 | Pearson ...................... 726/22 |
| 2001/0034847 A1 | 10/2001 | Gaul, Jr. |
| 2002/0032717 A1 | 3/2002 | Malan et al. |
| 2002/0032793 A1 | 3/2002 | Malan et al. |
| 2002/0032880 A1 | 3/2002 | Malan et al. |
| 2002/0035698 A1 | 3/2002 | Malan et al. |
| 2002/0083331 A1 | 6/2002 | Krumel |
| 2002/0083334 A1 | 6/2002 | Rogers et al. |
| 2002/0138753 A1 | 9/2002 | Munson |
| 2002/0144156 A1 | 10/2002 | Copeland, III |
| 2003/0037136 A1 | 2/2003 | Labovitz et al. |
| 2003/0088791 A1 | 5/2003 | Porras et al. |
| 2003/0212903 A1 | 11/2003 | Porras et al. |
| 2004/0010718 A1 | 1/2004 | Porras et al. |
| 2005/0251570 A1 * | 11/2005 | Heasman et al. ............ 709/224 |
| 2006/0272019 A1 * | 11/2006 | Addepalli .................... 726/23 |
| 2007/0113283 A1 * | 5/2007 | Hrabik et al. ................ 726/22 |
| 2007/0150574 A1 * | 6/2007 | Mallal et al. ................ 709/223 |
| 2007/0180526 A1 * | 8/2007 | Copeland, III ............... 726/23 |
| 2007/0294768 A1 * | 12/2007 | Moskovitch et al. ......... 726/24 |

FOREIGN PATENT DOCUMENTS

| | | |
|---|---|---|
| EP | 0 636 977 | 5/2001 |
| EP | 0 985 995 | 8/2003 |
| WO | WO 93/25024 | 12/1993 |
| WO | WO 98/41919 | 9/1998 |
| WO | WO 99/00720 | 1/1999 |
| WO | WO99/13427 | 3/1999 |
| WO | WO 99/15966 | 4/1999 |
| WO | WO 99/50734 | 10/1999 |
| WO | WO 99/53391 | 10/1999 |
| WO | WO99/57626 | 11/1999 |
| WO | WO 00/02115 | 1/2000 |
| WO | WO00/10278 | 2/2000 |
| WO | WO00/25214 | 5/2000 |
| WO | WO00/25527 | 5/2000 |
| WO | WO 00/25527 A2 | 5/2000 |
| WO | WO00/34867 | 6/2000 |
| WO | WO 00/34867 A1 | 6/2000 |
| WO | WO 00/54458 | 9/2000 |
| WO | WO 00/54458 A1 | 9/2000 |
| WO | WO 01/84285 | 11/2001 |
| WO | WO 02/06928 | 1/2002 |
| WO | WO 02/056152 | 7/2002 |
| WO | WO02/101516 | 12/2002 |
| WO | WO 2005114354 A1 * | 12/2005 |

OTHER PUBLICATIONS

Janakiraman et al, Indra: A peer-to-peer approach to network intrusion detection and prevention, 2003, IEEE, pp. 226-231.*

Deswarte et al, Internet Security: An Intrusion-Tolerance Approach, 2006, IEEE, pp. 432-441.*

Musman et al., "System or Security Managers Adaptive Response Tool," DARPA Information Survivability Conference and Exposition, 2000, Jan. 25, 2000, pp. 56-68.

Internet Security Systems, SAFEsuite Enterprise, SAFEsuite Decisions, 1998. (Pertinent pp. 47-51, ch. 4, sect. C).

Crosbie et al., Active Defence of a Computer System Using Autonomous Agents, Technical Report No. 95-008, Feb. 15, 1995, Purdue University, West Lafayette, Indiana, pp. 1-14. (Pertinent pp. 8-11, sects. 6-7).

Denning, An Intrusion-Dectection Model, Feb. 1987, IEEE Transactions on Software Engineering, vol. SE-13, No. 2, pp. 1-17. (Pertinenet pp. 1-2, sects. I-II).

Porras et al., Penetration State Transition Analysis A Rule-Based Intrusion Detection Approach, 1992, pp. 220-229. (Pertinent pp. 221-226, sects. 2-4).

Lindqvist et al., eXpert-BSM: A Host-based Intrusion Detection Solution for Sun Solaris, SRI International, Menlo Park, California, December 10-14, 2001, Proceedings of the 17$^{th}$ Annual Computer Security Applications Conference, pp. 1-12. (Pertinent pp. 7-9, sects. 4.3-4.4).

Debar et al., Research Report: A Revised Taxonomy for Intrusion-Detection Systems, Oct. 25, 1999, IBM Research, Switzerland, pp. 1-23. (Pertinent pp. 4-8, sects. 4-5).

NetworkICE Corporation, ICEcap Administrator's Guide, Version 1.0 BETA, 1999, pp. 1-142. (Pertinent pp. 15-24, setcs. 3).

Cisco Systems, Inc., NetRanger User's Guide Version 2.1.1, 1998. (Pertinent pp. 1-19, ch. 1).

Porras et al., A Mission-Impact Based Approach to INFOSEC Alarm Correlation, SRI International, Menlo Park, California, Oct. 2002, pp. 1-33. (Pertinent pp. 2-15, sects. 2-4).

Bace, An Introduction to Intrusion Detection and Assessment for System and Network Security Management, 1999, pp. 1-38. (Pertinent pp. 11-16).

Hunteman, Automated Information System—(AIS) Alarm System, University of California, Los Alamos National Laboratory, 20th National Information System Security Conference, Oct. 1997, pp. 1-12. (Pertinent pp. 4-10, sects. 3-6).

Luckham et al., Complex Event Processing in Distributed Systems, Aug. 18, 1988, Standford University, pp. 1-26. (Pertinent pp. 4-8, sects. 2).

Cuppens, Cooperative Intrusion Detection, pp. 1-10. (Pertinent pp. 2-9, sects. 2-7).

Mukherjee et al., Network Intrusion Detection, IEEE Network, May/Jun. 1994, pp. 26-41. (Pertinent pp. 33-39).

Kumar et al., An Application of Pattern Matching in Intrusion Detection, Technical Report No. CSD-TR-94-013, Jun. 17, 1994, Purdue University, pp. 1-55. (Pertinent pp. 15-26, sect. 4).

Jou et al., Architecture Design of a Scalable Intrusion Detection System for the Emerging Network Infrastructure, Technical Report CDRL A005, Apr. 1997, MCNC, pp. 1-42. (Pertinent pp. 24-28, sects. 4.1.3.2).

"Real Secure™, Network Sensor User Guide," Version 5.0, © 2000 by Internet Security Systems, Inc., pp. 1-42. (Pertinent pp. 5-31, chs. 2-3).

Anita D'Amico, Ph.D., "Assessment of Open e-Security Platform™; Vendor-Independent Central Management of Computer Security Resources," Applied Visions, Inc., 1999. (Pertinent pp. 6-10).

Essex, David, E-Sleuths Make Net Safe for E-Commerce, Computerworld, Jun. 2000, pp. 1-2.

Newman, David, Intrusion Detection Systems, Data Communications, 1998, pp. 1-9.

International Search Report for PCT/US02/17161 of Dec. 31, 2002.

Hyland, et al., Concentric Supervision of Security Applications: A New Security Management Paradigm Computer Security Applications Conference, 1998, pp. 59-68.

Koilpillai et al., Recon-A Tool for Incident Detection, Tracking and Response, Darpa Information Survivability Conference and Exposition, 2000, pp. 199-206.

Alves-Foss, J., An Overview of SNIF: A Tool for Surveying Network Information Flow, Network and Distributed System Security, 1995, pp. 94-101.

Mansouri-Samani et al., A Configurable Event Service for Distributed System Configurable Distributed Systems, 1996, pp. 210-217.

International Search Report for PCT/US01/13769 of Mar. 8, 2002.

Jagannathan et al., System Design Document: Next-Generation Intrusion Detection Expert Systems (NIDES), Internet Citation, Mar. 9, 1993, XP002136082, pp. 1-66.

Koilpillai, Adaptive Network Security Management, DARPA NGI PI Conference, Oct. 1998, pp. 1-27.

Hiverworld Continuous Adaptive Risk Management, Hiverworld, Inc., 1999-2000, pp. 1-14.

International Search Report for PCT/US02/04989of Sep. 19, 2002.

International Search Report for PCT/US02/02917 of Aug. 8, 2002.

International Search Report for PCT/US03/00155 of May 15, 2003.

NXI Communications, Inc., White Paper, NTS Security Issues, Oct. 15, 2001, pp. 1-12.

Mounji et al., Distributed Audit Trail Analysis, Proceedings of the Symposium of Network and Distributed Systems Security, San Diego, CA, Feb. 16-17, 1995, pp. 102-112.

Wobber et al., Authentication in the Taos Operating System, ACM Transactions on Computer Systems, vol. 12, No. 1, Feb. 1994, pp. 3-32.

Mayer et al., The Design of the Trusted Workstation: A True Infosec Product, 13th National Computer Security Conference, Washing, DC, Oct. 1-4, 1990, pp. 827-839.

Dawson, Intrusion Protection for Networks, Byte, Apr. 1995, pp. 171-172.

Buhkan, Checkpoint Charlie, PC Week Network, Nov. 27, 1995, pp. N1, N6-N7.

Process Software Technical Support Page, found on http://www.process.com/techsupport/whitesec.html, printed off of the Process Software website on Feb. 26, 2003, pp. 1-5.

Ganesan, BAfirewall: A Modern Firewall Design, Proceedings Internet Society Symposium on Network and Distributed System Security 1994, Internet Soc., 1994, pp. 99-108.

Lee, Trusted Systems, Chapter II-1-6 of Handbook of Information Security Management, Ed. Zella G. Ruthberg and Harold F. Tipton, Auerbach, Boston and New York, 1993, pp. 345-362.

Lunt, Automated Intrusion Detection, Chapter II-4-4 of Handbook of Information Security Management, Ed. Zella G. Ruthberg and Harold F. Tipton, Auerbach, Boston and New York, 1993, pp. 551-563.

Guha et al., Network Security via Reverse Engineering of TCP Code: Vulnerability Analysis and Proposed Solution, IEEE, Mar. 1996, pp. 603-610.

Garg et al., High Level Communication Primitives for Concurrent Systems, IEEE, 1988, pp. 92-99.

Hastings et al., TCP/IP Spoofing Fundamentals, IEEE, May 1996, pp. 218-224.

Snapp, Signature Analysis and Communication Issues in a Distributed Intrusion Dectection System, Master Thesis, University of California, Davis, California, 1991, pp. 1-40.

Guha et al., Network Security via Reverse Engineering of TCP Code: Vulnerability Analysis and Proposed Solutions, IEEE, Jul. 1997, pp. 40-48.

Djahandari et al., An MBone for an Application Gateway Firewall, IEEE, Nov. 1997, pp. 72-81.

Kim et al., Implementing a Secure Login Environment: A Case Study of Using a Secure Network Layer Protocol, Department of Computer Science, University of Alabama, Jun. 1995, pp. 1-9.

Satyanarayanan, Integrating Security in a Large Distributed System, Acm Transaction on Computer Systems, vol. 7, No. 3, Aug. 1989, pp. 47-280.

Sammons, Nathaniel, "Multi-platform Interrogation and Reporting with Rscan," The Ninth Systems Administration Conference, LISA 1995, Monterrey, California, Sep. 17-22, 1995, pp. 75-87.

Dean et al., "Java Security: From HotJava to Netscape and Beyond," Proceedings of the 1996 IEEE Symposium on Security and Privacy, May 6-8, 1996, Oakland, California, pp. 190-200.

Fisch et al., "The Design of an Audit Trail Analysis Tool," Proceedings of the 10th Annual Computer Security Applications Conference, Dec. 5-9, 1994, Orlando, Florida, pp. 126-132.

Safford et al., "The TAMU Security Package: An Ongoing Response to Internet Intrude in an Academic Evironment," USENIX Symposium Proceedings, UNIX Security IV, Oct. 4-6, 1993, Santa Clara, California, pp. 91-118.

Sugawara, Toshiharu, "A Cooperative LAN Diagnostic and Observation Expert System," Ninth Annual Phoenix Conference on Computers and Communications, 1990 Conference Proceedings, Mar. 21-23, 1990, Scottsdale, Arizona, pp. 667-674.

Casella, Karen A., "Security Administration in an Open Networking Environment," The Ninth Systems Administration Conference, LISA 1995, Monterrey, California, Sep. 17-22, 1995, pp. 67-73.

Burchell, Jonathan, "Vi-SPY: Universal NIM?" Virus Bulletin, Jan. 1995, pp. 20-22.

Benzel et al., "Identification of Subjects and Objects in a Trusted Extensible Client Server Architecture," 18th National Information Systems Security Conference, Oct. 10-13, 1995, Baltimore, Maryland, pp. 83-99.

Epstein et al., "Component Architectures for Trusted Netware," 18th National Information Systems Security Conference, Oct. 10-13, 1995, Baltimore, Maryland, pp. 455-463.

Varadharajan, Vijay, "Design and Management of a Secure Networked Administration System: A Practical Approach," 19th National Information Systems Security Conference, Oct. 22-25, 1996, Baltimore, Maryland, pp. 570-580.

Snapp et al., "DIDS (Distributed Intrusion Detection System)—Motivation, Architecture, and An Early Prototype," 14th National Computer Security Conference, Oct. 1-4, 1991, Washington, DC, pp. 167-176.

Broner et al., "IntelligentI/O Rule-Based Input/Output Processing for Operating Systems," Operating Systems Review, vol. 25, No. 3, Jul. 1991, pp. 10-26.

Drews et al., "Special Delivery— Automatic Software Distribution Can Make You A Hero," Network Computing, Aug. 1, 1994, pp. 80, 82-86, 89, 91-95.

Morrissey, Peter, "Walls," Network Computing, Feb. 15, 1996, pp. 55-59, 65-67.

Harlander, Dr. Magnus, "Central System Administration in a Heterogenous Unix Environment: GeNUAdmin," Proceedings of the Eighth Systems Administration Conference (LISA VIII), Sep. 19-23, 1994, San Diego, California, pp. 1-8.

Shaddock et al., "How to Upgrade 1500 Workstations on Saturday, and Still Have Time to Mow the Yard on Sunday," The Ninth Systems Administration Conference LISA '95, Sep. 17-22, 1995 Monterrey, California, pp. 59-65.

Anderson, Paul, "Towards a High-Level Machine Configuration System," Proceedings of the Eighth Systems Administration Conference (LISA VIII), Sep. 19-23, 1994, San Diego, California, pp. 19-26.

Cooper, Michael A., "Overhauling Rdist for the '90s," Proceedings of the Sixth Systems Administration Conference (LISA VI), Oct. 19-23, 1992, Long Beach, California, pp. 175-188.

Vangala et al., "Software Distribution and Management in a Networked Environment," Proceedings of the Sixth Systems Administration Conference, Oct. 19-23, 1992, Long Beach, California, pp. 163-170.

Kim et al., "The Design and Implementation of Tripwire: A File System Integrity Checker," $2^{nd}$ ACM Conference on Computer and Communications Security, Nov. 2-4, 1994, Fairfax, Virginia, pp. 18-29.

Winn Schwartau, "e.Security™-Solving 'Dumb Days' With Security Visualization," e.Security. Inc., Naples, FL 34103, 2000.

Anita D'Amico, Ph.D., "Assessment of Open e-Security Platform™: Vendor-Independent Central Management of Computer Security Resources," Applied Visions, Inc., 1999.

"e.Security™-Open Enterprise Security Management: Delivering an integrated, automated, centrally Managed Solution You Can Leverage Today and Tomorrow," e-Security, Inc., Naples, FL 34102, 1999.

"e-Security™-Vision," e-Security, Inc., Naples, FL, 1999.

"e.Security™-Administrator Workbench™," e-Security, Inc. Naples, FL, 1999.

"e.Security™-Fact Sheet," e-Security, Inc., Naples, FL, 1999.

"e.Security™-Open e-Security Platform™," e-Security, Inc. Naples, FL, 1999.

Babcock, "E-Security Tackles The Enterprise," Jul. 28, 1999; Inter@ctive Week, www.Zdnet.com.

Kay Blough, "In Search of More-Secure Extranets," Nov. 1, 1999, www.InformationWeek.com.

Paul H. Desmond, "Making Sense of Your Security Tools," Software Magazine and Wiesner Publishing www.softwaremag.com, 1999.

Kay Blough, "Extra Steps Can Protect Extranets," Nov. 1, 1999, www.InformationWeek.com.

Sean Hao, "Software protects e-commerce-e-Security's product alerts networks when hackers attack," Florida Today, Florida.

Scott Weiss, "Security Strategies-E-Security, Inc.," product brief, Hurwitz Group, Inc., Mar. 24, 2000.

Sean Adee, CISA, "Managed Risk, Enhanced Response—The Positive Impact of Real-Time Security Awareness," Information Systems Control Journal, vol. 2, 2000.

"Reprint Review—The Information Security Portal—Open e-Security Platform Version 1.0", Feb. 2000, West Coast Publishing, SC Magazine, 1999.

e.Security—"Introducing the First Integrated, Automated, and Centralized Enterprise Security Management System," white paper, e-Security, Inc., Naples, FL 34102, 1999.

Ann Harrison, "Computerworld—Integrated Security Helps Zap Bugs," Feb. 21, 2000, Computerworld, vol. 34, No. 8, Framingham, MA.

Shruti Daté, "Justice Department Will Centrally Monitor Its Systems For Intrusions," Apr. 3, 2000, Post-Newsweek Business Information, Inc., www.gcn.com.

e.Security™, website pages (pp. 1-83), www.esecurityinc.com, e-Security, Inc., Naples, FL 34103, Sep. 14, 2000.

Peter Sommer, "Intrusion Detection Systems as Evidence," Computer Security Research Centre, United Kingdom.

Musman et al., System or Security Managers Adaptive Response Tool, DARPA Information Survivability Conference and Exposition, Jan. 25, 2000, pp. 56-68.

Gibson Research Corporation Web Pages, Shields Up!—Internet Connection Security Analysis, grc.com/default.htm, Laguna Hills, California, 2000.

Rouse et al., Design and Evaluation of an Onboard Computer-Based Information System fro Aircraft, IEEE Transactions of Systems, Man, and Cybernetics, vol. SMC-12, No. 4, Jul./Aug. 1982, pp. 451-463.

Hammer, An Intelligent Flight-Management Aid for Procedure Execution, IEEE Transactions on Systems, Man, and Cybernetics, vol. SMC-14, No. 6, Nov./Dec. 1984, pp. 885-888.

Mann et al., Analysis of User Procedural Compliance in Controlling a Simulated Process, IEEE Transactions on Systems, Man, and Cybernetics, vol. SMC-16, No. 4, Jul./Aug. 1986.

Todd, Signed and Delivered: An Introduction to Security and Authentication, Find Out How the Jave Security API Can Help you Secure your Code, Javaworld, Web Publishing, Inc., San Francisco, Dec. 1, 1998, pp. 1-5.

Arvind, Secure This. Inform, Association for Information and Image Management, Silver Spring, Sep./Oct. 1999, pp. 1-4.

Stevens, TCP/IP Illustrated, vol. 1, 1994, p. 247.

Lee et al., A Generic Virus Detection Agent on the Internet, IEEE, $30^{th}$ Annual Hawaii International Conference on System Sciences, 1997, vol. 4.

Cutler, Inside Windows NT, 1993, Microsoft Press.

Duncan, Advanced MS-Dos, 1986, Microsoft Press.

McDaniel, IBM Dictionary of Computing, 1994, International Business Machines Corporation.

Burd, Systems Architecture, 1998, Course Technology, Second Edition.

Programmer's Guide PowerJ, 1997, Sybase.

Swimmer et al., Dynamic detection and classification of computer viruses using general behavior patterns, 1995, Proceedings of the Fifth International Virus Bulletin Conference, Boston.

Advanced Virus Detection Technology for the Next Millennium, Aug. 1999, Network Associates, A Network Associates Executive White Paper, pp. 1-14.

Enterprise-Grade Anti-Virus Automation in the $21^{st}$ Century, Jun. 2000, Symantec, Technology Brief, pp. 1-17.

Kephart et al., Blueprint for a Computer Immune System, 1997, Retrieved from Internet, URL: http//www.research.ibm.com/antivirus/scipapers/kephart/VB97, pp. 1-15.

Richardson, Enterprise Antivirus Software, Feb. 2000, Retrieved from Internet, URL: http://www.networkmagazine.com/article/nmg20000426S0006, pp. 1-6.

Understanding and Managing Polymorphic Viruses, 1996, Symantec, The Symantec Enterprise Papers, vol. XXX, pp. 1-13.

Gong, JavaTM Security Architecture (JDK1.2), Oct. 2, 1998, Sun Microsystems, Inc., Version 1.0, pp. i-iv, 1-62.

Softworks Limited VBVM Whitepaper, Nov. 3, 1998, Retrieved from the Internet, URL: http://web.archive.org/web/19981203105455/http://softworksltd.com/vbvm.html, pp. 1-4.

Kephart, A Biologically Inspired Immune System for Computers, 1994, Artificial Life IV, pp. 130-139.

International Search Report for PCT/US01/26804 of Mar. 21, 2002.

Kosoresow et al., Intrusion Detection via System Call Traces, IEEE Software, pp. 35-42, Sep./Oct. 1997.

Veldman, Heuristic Anti-Virus Technology, Proceedings, $3^{rd}$ International Virus Bulletin Conference, pp. 67-76, Sep. 1993.

Symantec, Understanding Heuristics: Symantec's Bloodhound Technology, Symantec White Paper Series, vol. XXXIV, pp. 1-14, Sep. 1997.

Nachenberg, A New Technique for Detecting Polymorphic Computer Viruses, A thesis submitted in partial satisfaction of the requirements for the degree Master of Science in Computer Science, University of California Los Angeles, pp. 1-127, 1995.

Microsoft P-Code Technology, http://msdn.microsoft.com/archive/default.asp?url=/archive/en-us/dnarvc/html/msdn_c7pcode2.asp, pp. 1-6, Apr. 1992.

DJGPP COFF Spec, http://delorie.com/djgpp/doc/coff/, pp. 1-15, Oct. 1996.

Natvig, Sandbox Technology Inside AV Scanners, Virus Bulletin Conference, Sep. 2001, pp. 475-488.

Norman introduces a new technique for eliminating new computer viruses, found on Norman's website, file://c:/documents%20and%20settings\7489\local%20settings\temporary%20internet%20files\olk, pp. 1-2, published Oct. 25, 2001, printed from website Dec. 27, 2002.

International Search Report for PCT/US01/19142 of Jan. 17, 2003.

Using the CamNet BBS FAQ, http://www.cam.net.uk/manuals/bbsfaq/bbsfaq.htm, Jan. 17, 1997.

Express Storehouse Ordering System, "Accessing ESOS through the Network", http://www-bfs.ucsd.edu/mss/esos/man3.htm, Sep. 3, 1996.

NASIRE, NASIRC Bulletin #94-10, http://cs-www.ncsl.nist.gov/secalert/nasa/nasa9410.txt, Mar. 29, 1994.

Packages in the net directory, http://linux4u.jinr.ru/usoft/WWW/www_debain.org/FTP/net.html, Mar. 20, 1997.

Sundaram, An Introduction to Intrusion Detection, Copyright 1996, published at www.acm.org/crossroads/xrds2-4/intrus.html, pp. 1-12.

Samfat, IDAMN: An Intrusion Detection Architecture for Mobile Networks, IEEE Journal on Selected Areas in Communications, vol. 15, No. 7, Sep. 1997, pp. 1373-1380.

INFO: Visual Basic Supports P-Code and Native Code Compilation (Q229415), http://support.microsoft.com/support/kb/articles/Q229/4/15.ASP, pp. 1-2, Apr. 28, 1999.

International Search Report for PCT/US99/29117 of May 2, 2000.

Nordin, U of MN OIT Security and Assurance, Feb. 9, 2000.

Internet Security Systems, RealSecure SiteProtector, SAFEsuite Decisions to SiteProtector Migration, Aug. 8, 2003, pp. 1-42.

Internet Security Systems, SAFEsuite Enterprise, SAFEsuite Decisions, 1998.

Internet Security Systems, SAFEsuite Enterprise, Recognizing the Need for Enterprise Security: An Introduction to SAFEsuite Decisions, Aug. 1998, pp. 1-9.

Internet Security Systems, SAFEsuite Decisions 2.6, Frequently Asked Questions, Feb. 21, 2001, pp. 1-10.

Internet Security Systems, SAFEsuite Decisions Version 1.0, User's Guide, 1998, pp. 1-78.

Porras et al., Emerald: Event Monitoring Enabling Responses to Anomalous Live Disturbances, Computer Science Laboratory, SRI International, Menlo Park, CA, Oct. 1997, pp. 353-365.

Cisco Systems, Empowering the Internet Generation, 1998.

Messmer, Start-Up Puts Hackers on BlackICE, Network World Fusion, http://www.nwfusion.com/cgi-bin/mailto/x/cgi, Apr. 21, 1999, p. 1-2.

NeworkICE Corporation, Can You Explain How Your Product Can Protect a Remote User with a VPN Client?, 1998-1999, pp. 1-2, http://www.webarchive.org/web/20000304071415/advice.networkice.com/advice/support/kb/q000003/default.

Yasin, Start-Up Puts Network Intruders on Ice, http://www.internetweek.com/story/INW19990505S0001, May 5, 1999, pp. 1-2.

Morency, NetworkWorldFusion, http://nwfusion.com/cgi-bin/mailto/x.cgi, Jun. 28, 1999, pp. 1-2.

Rogers, Network ICE Touts Security Wares, Apr. 23, 1999, San Mateo, California, http://www.crn.com/showArticle.jhtml?articleID=18829106&flatPage=true, pp.1-2.

Rogers, Network ICE Signs Resellers, May 26, 1999, San Mateo, California, http://www.crn.com/showArticle.jhtml?articleID=18805302&flatPage=true, pp. 1-2.

Internet Security Systems, I've Been Attacked! Now What?, Aug. 27, 1999, http://www.iss.net/security_center/advice/Support/KB/q000033/default.htm, pp. 1-2.

Internet Security Systems, What is the Format of "Attack-List.CSV"?, Aug. 21, 1999, http://www.iss.net/security_center/advice/Support/KB/q000018/default.htm, pp. 1-2.

Neumann et al., Experience with Emerald to Date, Apr. 11-12, 1999, 1st USENIX Workshop on Intrusion Detection Network Monitoring, Santa Clara, California, pp. 1-9.

Lindqvist et al., Detecting Computer and Network Misuse Through the Production-Based Expert System Toolset (P-BEST), May 9-12, 1999, Proceedings of the 1999 IEEE Symposium on Security and Privacy, Oakland, California, pp. 1-16.

Kendall, A Database of Computer Attacks for the Evaluation of Intrusion Detection Systems, Jun. 1999, Department of Defense Advanced Research Projects Agency, pp. 1-124.

Neumann, Computer Security and the U.S. Infrastructure, Nov. 6, 1997, Congressional Testimony, pp. 1-11.

Porras et al., Life Traffic Analysis of TCP/IP Gateways, Nov. 10, 1997, Internet Society's Networks and Distributed Systems Security Systems Symposium, Mar. 1998, http://www.sdl.sri.com/projects/emerald/live-traffic.html, pp. 1-16.

Raynaud et al., Integrated Network Management IV, 1995, Proceedings of the 4$^{th}$ International Symposium on Integrated Network Management, pp. 1-2 and 5-16.

Heberlein et al., A Method to Detect Intrusive Activity in a Networked Environment, Oct. 1-4, 1991, 14$^{th}$ National Computer Security Conference, Washington, D.C., pp. 362-363 and 365-371.

Ko et al., Execution Monitoring of Security-Critical Programs in Distributed Systems: A Specification-Based Approach, 1997, Proceedings of the 1997 IEEE Symposium on Security and Privacy, pp. 175-187.

Crosbie et al., Active Defense of a Computer System Using Autonomous Agents, Technical Report No. 95-008, Feb. 15, 1995, Purdue University, West Lafayette, Indiana, pp. 1-14.

Mansouri-Samani et al., Monitoring Distributed Systems, Nov. 1993, IEEE Network, pp. 20-30.

Jakobson et al., Alarm Correlation, Nov. 1993, IEEE Network, pp. 52-59.

Anderson et al., Next-Generation Intrusion Detection Expert (NIDES), A Summary, May 1995, SRI International, pp. 1-37.

Veritas Software, Press Release, Robust Enhancements in Version 6.0 Maintain Seagate WI as the De Facto Standard for Software Distribution, Oct. 6, 1997, Press Releases, pp. 1-4, http://216.239.39.104/search?q=cache:HS9kmK1m2QoJ:www.veritas.com/us/aboutus/pressroom/199....

Yasin, Network-Based IDS are About to Stop Crying Wolf, Security Mandate: Silence False Alarms, Apr. 9, 1999, http://lists.jammed.com/ISN/1999/04/0021.html, pp. 1-3.

Internet Security Systems, Press Release, ISS Reports Record Revenues and Net Income for Second Quarter, Jul. 19, 1999, http://bvlive01.iss.net/issEn/delivery/prdetail.jsp?type=Financial&oid=14515, pp. 1-5.

LaPadula, State of the Art in CyberSecurity Monitoring, A Supplement, Sep. 2001, Mitre Corporation, pp. 1-15.

Balasubramaniyan et al., An Architecture for Intrusion Detection Using Autonomous Agents, Jun. 11, 1998, Purdue University, West Lafayette, Indiana, pp. 1-4, http://gunther.smeal.psu.edu/images/b9/f3/bb/9e/ba7f39c3871dcedeb9abd0f70cb84607/1.png.

Crosbie et al., Active Defense of a Computer System Using Autonomous Agents, Feb. 15, 1995, Technical Report No. 95-008, Purdue University, West Lafayette, Indiana, pp. 1-14.

Crosbie et al., Defending a Computer System Using Autonomous Agents, Mar. 11, 1994, Technical Report No. 95-002, Purdue University, West Lafayette, Indiana, pp. 1-11.

Denning, An Intrusion-Detection Model, Feb. 1987, IEEE Transactions on Software Engineering, vol. SE-13, No. 2, pp. 1-17.

Lunt, A Survey of Intrusion Detection Techniques, 1993, Computers & Security, 12 (1993), pp. 405-418.

Porras et al., Penetration State Transition Analysis A Rule-Based Intrusion Detection Approach, 1992, pp. 220-229.

Javitz et al., The NIDES Statistical Component: Description and Justification, SRI International, Menlo Park, California, SRI Project 3131, Mar. 7, 1994.

Lindqvist et al., Detecting Computer and Network Misuses Through the Production-Based Expert System Toolset (P-BEST), Oct. 25, 1998, pp. 1-20.

Javitz et al., The SRI IDES Statistical Anomaly Detector, SRI Internationa, Menlo Park, California, May 1991, IEEE Symposium on Security and Privacy, pp. 1-11.

Porras et al., Live Traffic Analysis of TCP/IP Gateways, Nov. 10, 1997, SRI International, Menlo Park, California, pp. 1-16.

Porras et al., Live Traffic Analysis of TCP/IP Gateways, Dec. 12, 1997, SRI International, Menlo Park, California, Proceedings of the 1998 ISOC Symposium on Network and Distributed Systems Security, pp. 1-13.

Information & Computing Sciences: System Design Laboratory: Programs: Intrusion Detection, SRI International, http://www.sdl.sri.com/programs/intrusion/, Jun. 17, 2004, pp. 1-2.

Lindqvist et al., eXpert-BSM: A Host-based Intrusion Detection Solution for Sun Solaris, SRI International, Menlo Park, California, Dec. 10-14, 2001, Proceedings of the 17th Annual Computer Security Applications Conference, pp. 1-12.

Almgren et al., Application-Integrated Data Collection for Security Monitoring, Oct. 10-12, 2001, SRI International, Menlo Park, California, pp. 1-15.

Debar et al., Research Report: A Revised Taxonomy for Intrusion-Detection Systems, Oct. 25, 1999, IBM Research, Switzerland, pp. 1-23.

Porras et al., Emerald: Event Monitoring Enabling Responses to Anomalous Live Disturbances, Computer Science Laboratory, SRI International, Menlo Park, CA, Dec. 18, 1996, pp. 1-3.

Frequently-Asked Questions about RealSecure, pp. 1-14, http://web.archive.org/web/19970721183227/iss.net/prod/rs_faq.html, May 30, 1997.

Cisco Systems, Inc., Empowering the Internet Generation, 1998.

Internet Security Systems, Inc., RealSecure Release 1.2 for UNIX, A User Guide and Reference Manual, 1997.

Internet Security Systems, Inc., Real-time attack recognition and response: A solution for tightening network security, Jan. 1997, pp. 1-13.

Internet Security Systems, Inc., SAFEsuite Decisions User Guide, Version 1.0, 1998, pp. 1-78.

NetworkICE Corporation, ICEcap Administrator's Guide, Version 1.0 BETA, 1999, pp. 1-142.

Debar, Herve et al., A Neural Network Component for an Intrusion Detection System, 1992, pp. 240-250.

SRI International, A Prototype IDES: A Real-Time Intrusion-Detection Expert System, Aug. 1987, p. 1-63.

SRI International, Requirements and Model for IDES-A Real-Time Intrusion-Detection Expert System, Aug. 1985, pp. 1-70.

SRI International, An Intrusion-Detection Model, Nov. 1985, pp. 1-29.

Dowell et al., The ComputerWatch Data Reduction Tool, Proc. of the 13th National Computer Security Conference, Washington, D.C., Oct. 1990, pp. 99-108.

Fox et al., A Neural Network Approach Towards Intrusion Detection, Jul. 2, 1990, pp. 125-134.

Garvey et al., Model-Based Intrusion Detection, Oct. 1991, pp. 1-14.

Ilgun et al., State Transition Analysis: A Rule-Based Intrusion Detection Approach, Mar. 1995, pp. 181-199.

Javitz et al., The SRI IDES Statistical Anomaly Detector, May 1991, pp. 1-11.

SRI International, The NIDES Statistical Component Description and Justification, Mar. 7, 1994, pp. 1-46.

Karen, Oliver, PC Magazine, The Digital Doorman, Nov. 16, 1999, p. 68.

Liepins et al., Anomaly Detection: Purpose and Framework, 1989, pp. 495-504.

Lindqvist et al., Detecting Computer and Network Misuse Through the Production-Bases Expert System Toolset (P-BEST), Oct. 25, 1998, pp. 1-20.

Lunt, Teresa, A survey of intrusion detection techniques, 1993, pp. 405-418.

Lunt, Teresa, Automated Audit Trail Analysis and Intrusion Detection: A Survey, Oct. 1988, pp. 1-8.

Porras et al., Penetration State Transition Analysis A Rule-Based Intrusion Detection Approach, 1992, pp. 220-229.

Sebring et al., Expert Systems in Intrusion Detection: A Case Study, Oct. 1988, pp. 74-81.

Shieh et al., A Pattern-Oriented Intrusion-Detection Model and Its Applications, 1991, pp. 327-342.

Smaha, Stephen, Haystack: An Intrusion Detection System, 1988.

Snapp, Steven Ray, Signature Analysis and Communication Issue in a Distributed Intrusion Detection System, 1991, pp. 1-40.

Porras et al., EMERALD: Event Monitoring Enabling Responses to Anomalous Live Disturbances, Oct. 1997, pp. 353-365.

Lunt et al., Knowledge-Based Intrusion Detection, Mar. 1989, pp. 102-107.

Lunt et al., An Expert System to Classify and Sanitize Text, Dec. 1987, pp. 1-5.

Tener, William, Computer Security in the Age of Information, AI & 4GL: Automated Detection and Investigation Tools, 1989, pp. 23-29.

Teng et al., Adaptive Real-time Anomaly Detection Using Inductively Generated Sequential Patterns, 1990, pp. 278-284.

Vaccaro et al., Detection of Anomalous Computer Session Activity, 1989, pp. 280-289.

Winkler, J.R., A UNIX Prototype for Intrusion and Anomaly Detection in Secure Networks, 1990, pp. 115-124.

Boyen et al., Tractable Inference for Complex Stochastic Process, Jul. 24-26, 1998.

Copeland, Observing Network Traffic—Techniques to Sort Out the Good, the Bad, and the Ugly, 2000, pp. 1-7.

Goan, Terrance, Communications of the ACM, A Cop on the Beat Collecting and Appraising Intrusion Evidence, Jul. 1999, pp. 47-52.

Heberlein et al., A network Security Monitor, 1990, pp. 296-304.

Jackson et al., An Expert System Applications for Network Intrusion Detection, Oct. 1991, pp. 1-8.

Lankewicz et al., Real-Time Anomaly Detection Using a Nonparametric Pattern Recognition Approach, 1991, pp. 80-89.

Lippmann et al., Evaluating Intrusion Detection Systems: The 1998 DARPA Off-line Intrusion Detection Evaluation, 1999.

Munson et al., Watcher: The Missing Piece of the Security Puzzle, Dec. 2001.

Pearl, Judea, Probabilistic Reasoning in Intelligent Systems: Networks of Plausible Inference, Sep. 1988.

Porras et al., Live Traffic Analysis of TCP/IP Gateways, Dec. 12, 1997, pp. 1-13.

EMERALD TCP Statitical Analyzer 1998 Evaluation Results, http://www.sdl.sri.com/projects/emerald/98-eval-estat/index.html, Jul. 9, 1999, pp. 1-15.

Staniford-Chen, GrIDS-A Graph Based Intrusion Detection System for Large Networks, Oct. 1996.

Tener, William, Discovery: An Expert System in the Commercial Data Security Environment, Dec. 1986, pp. 45-53.

Valdes et al., Adaptive, Model-Based Monitoring for Cyber Attack Detection, 2000, pp. 1-19.

SRI International, Blue Sensors, Sensor Correlation, and Alert Fusion, Oct. 4, 2000.

Valdes et al., Statistical Methods for Computer Usage Anomaly Detection Using NIDES, Jan. 27, 1995, pp. 306-311.

Wimer, Scott, The Core of CylantSecure, http://www.cylant.com/products/core.html, 1999, pp. 1-4.

Zhang et al., A Hierarchical Anomaly Network Intrusion Detection System using Neural Network Classification, Feb. 2001.

Cisco Secure Intrusion Detection System 2.1.1 Release Notes, http://www.cisco.com/univercd/cc/td/doc/product/iaabu/csids/csids3/nr211new.htm, Jun. 10, 2003, pp. 1-29.

Linux Weekly News, http://lwn.net/1998/0910shadow.html, Sep. 8, 1998, pp. 1-38.

Cracker Tracking: Tighter Security with Intrucsion Detection, http://www.bvte.com/art/9805/sec20/art1.htm, May 1998, pp. 1-8.

Cisco Systems, Inc., Newtork RS: Intrusion Detection and Scanning with Active Audit Session 1305, 1998.

Business Security Advisor Magazine, Intrusion Detection Systems: What You Need to Know, http://advisor.com/doc/0527, Sep. 1998, pp. 1-7.

Garvey et al., An Inference Technique for Integrating Knowledge from Disparate Sources, Multisensor Integration and Fusion for Intelligenct Machines and Systems, 1995, pp. 458-464.

Power et al., CSI Intrusion Detection System Resource, Jul. 1998, pp. 1-7.

Cisco Systems, Inc., NetRanger Use's Guide Version 2.1.1, 1998.

Internet Security Systems, Real-Time Attack Recognition and Response: A Solution for Tightening Network Security, http://www.iss.net, 1997, pp. 1-13.

Network ICE Corporation, Network ICE Production Documentation, pp. 1-3, http://www.web.archive.org/web/20011005080013/www.networkice.com/support/documentation.html, Jul. 6, 2004.

Network ICE Corporation, Network ICE Documentation, p. 1, http://www.web.archive.org/web/19991109050852/www.networkice.com/support/docs.htm, Jul. 6, 2004.

Network ICE Corporation, Network ICE Press Releases, p. 1, http://www.web.archive.org/web/19990903214428/www.netice.com/company/pressrelease/press.htm, Jul. 7, 2004.

Network ICE Corporation, Network ICE Press Releases, p. 1, http://www.web.archive.org/web/20000304074934/www.netice.com/company/pressrelease/press.htm, Jul. 7, 2004.

Brentano et al., An Architecture for Distributed Intrusion Detection System, Department of Energy Computer Security Group, 14th Annual Conference Proceedings, pp. (17)25-17(45), May 1991.

Staniford-Chen et al., GrIDS-A Graph Based Intrusion Detection System for Large Networks, University of California, Davis, California, 19th National Information Systems Security Conference, 1996, pp. 1-10.

Ricciulli et al., Modeling Correlated Alarms in Network Management Systems, SRI International, Menlo Park, California, Proceedings of the Conference on Communication Networks and Distributed System Modeling and Simulation, 1997, pp. 1-8.

Porras et al., Emerald: Event Monitoring Enabling Responses to Anomalous Live Disturbances, SRI International, Menlo Park, California, 20th National Information Systems Security Conference, Oct. 1997, pp. 1-24.

Porras et al., A Mission-Impact Based Approach to INFOSEC Alarm Correlation, SRI International, Menlo Park, California, Oct. 2002, pp. 1-33.

Phrack 55 Download (234 kb, Sep. 9, 1999), http://www.phrack.org/show.php?p=55&a=9, pp. 1-6.

Porras et al., A Mission-Impact-Based Approach to INFOSEC Alarm Correlation, SRI International, Menlo Park, California, Oct. 2002, pp. 1-19.

Bace, An Introduction to Intrusion Detection and Assessment for System and Network Security Management, 1999, pp. 1-38.

Hunteman, Automated Information System—(AIS) Alarm System, University of California, Los Alamos National Laboratory, 20th National Information System Security Conference, Oct. 1997, pp. 1-12.

Janakiraman et al., Indra: A Peer-to-Peer Approach to Network Intrusion Detection and Prevention, Proceedings of the 12th International Workshop on Enabling Technologies: Infrastructure for Collaborative Enterprises, 2003, pp. 1-5.

Innella, Intrusion Detection Systems (IDS), Navy Information Assurance, Jun. 28, 2004, pp. 1-4, http://www.infosec.navy.mil/ps/?t=infosecprodsservices/infosecprodsservices.tag&bc=/infosecprodsservices/b...

Curry, Intrusion Detection Systems, IBM Emergency Response Service, Coast Laboratory, http://www.cerias.purdue.edu/about/history/coast_resources/idcontent/ids.html, Jul. 19, 2004, pp. 1-28.

Lunt et al., Knowledge-Based Intrusion Detection, SRI International, Menlo Park, California, Conference on AI Systems in Government, Washington, D.C., Mar. 1989, pp. 102-107.

A. Information Assurance BAA 98-34 Cover Sheet, SRI International, Nov. 1, 2000, pp. 2-35.

NetScreen Products, FAQ, http://www.netscreen.com/products/faq.html, Feb. 28, 2003, pp. 1-6.

Miller, A Network Under Attack: Leverage Your Existing Instrumentation to Recognize and Respond to Hacker Attacks, NetScout Systems, Westford, MA, Apr. 2003, pp. 1-8.

Technology Brief: Intrusion Detection for the Millennium, Internet Security Systems, 2000, pp. 1-6.

Weiss et al., Analysis of Audit and Protocol Data using Methods from Artificial Intelligence, Siemens AG, Munich, Germany, Proc. of the 13th National Computer Security Conference, Washington, D.C., Oct. 1990, pp. 109-114.

Snapp et al., DIDS (Distributed Intrusion Detection System)—Motivation, Architecture, and an Early Protype), University of California, Davis California, Proc. 14th National Computer Security Conference, Washington, D.C., Oct. 1991, pp. 167-176.

Internet Security Systems, Inc., SAFEsuite Enterprise Edition, Project "Gatekeeper" 1.0, Market Requirements Document, Mar. 30, 1998, pp. 1-12.

Internet Security Systems, SAFEsuite Decisions, 2000, pp. 1-2.

Internet Security Systems, Dynamic Threat Protection, Presse-Roundtable, Munich, Germany, Apr. 10, 2003, pp. 1-63.

Internet Security Systems, Preliminary ODM 1.0 Functional Specification, Aug. 1997, pp. 1-7.

Internet Security Systems, Inc., Scanner-ISSDK Interface, Design Specification, Jun. 2, 2000, Draft 1.07, pp. 1-7.

RealSecure, Adaptive Network Security Manager Module Programmer's Reference Manual, pp. 1-74.

Advanced Concept Technology Demonstrations (ACTD), 2005, pp. 1-28.

Frank, Sounding the Alarm, Sep. 6, 1999, Federal Computer Week, pp. 1-2.

Crumb, Intrusion Detection Systems to be Integrated at AFRL, Air Force Research Laboratory, News@AFRL, Fall 1999, p. 1.

Temin, Case Study: The IA: AIDE System at Two, 15th Annual Computer Security Applications Conference, Dec. 6-10, 1999, Phoenix, Arizona, pp. 1-26.

Spink, Automated Intrusion Detection Environment (AIDE), Intrusion Detection Sensor Fusion, Sep. 7, 1999, pp. 1-25.

Frincke et al., A Framework for Cooperative Intrusion Detection, 21st National Information Systems Security Conference, Oct. 6-9, 1998, Crystal City, Virginia, pp. 1-20.

Anderson et al., In Athena's Camp: Preparing for Conflict in the Information Age, An Exploration of Cyberspace Security R&D Investment Strategies for DARPA: The Day After-in Cyberspace II, Chapter Eleven, 1996, pp. 253-271.

Valdes et al., SRI International, Probabilistic Alert Correlation, 2001, pp. 1-15.

Bass, Multisensor Data Fusion for Next Generation Distributed Intrusion Detection Systems, Apr. 28, 1999, Iris National Symposium, pp. 1-6.

Perrochon et al., Enlisting Event Patterns for Cyber Battlefield Awareness, No Date, Stanford University, pp. 1-12.

Perrochon, Using Context-Based Correlation in Network Operations and Management, Jul. 2, 1999, Stanford University, pp. 1-20.

Perrochon, Real Time Event Based Analysis of Complex Systems, Jun. 1998, pp. 1-9.

Luckham et al., Complex Event Processing in Distributed Systems, Aug. 18, 1988, Stanford University, pp. 1-26.

Pettigrew, US Southcom United States Southern Command's Information Sharing Projects, Summer 1999, IAnewsletter, vol. 3, No. 1, pp. 1-24.

Levitt et al., CMAD IV, Computer Misuse & Anomaly Detection, Session Summaries, Nov. 12-14, 1996, Proceedings of the Fourth Workshop on Future Directions in Computer Misuse and Anomaly Detection, Monterey, California, pp. 1-86.

Cheung et al., The Design of GrIDS: A Graph-Based Intrusion Detection System, Jan. 26, 1999, University of California, pp. 1-51.

Cohen et al., Report of the Reporting and Analysis Track, Detection of Malicious Code, Intrusions, and Anomalous Activities Workshop, Feb. 22-23, 1999, pp. 1-47.

Garofalakis et al., Network Mining and Analysis: The Nemesis Project, Bell Labs, Lucent Technologies, No Date, pp. 1-12.

RealSecure ICEcap Manager User Guide Version 3.6, Internet Security Systems, Inc., 1998-2002, pp. 1-228.

Cuppens, Cooperative Intrusion Detection, Date Unknown, pp. 1-10.

Mukherjee et al., Network Intrusion Detection, IEEE Network, May/Jun. 1994, pp. 26-41.

Machlis, Net Monitoring Tools Gain Real-Time Alerts, Apr. 14, 1997, http://www.computerworld.com, pp. 1-12.

OmniGuard/ITA Intruder Alert, AXENT Technologies, Inc., Nov. 17, 2004, http://www.web.archive.org, pp. 1-10.

NetRanger Overview, Chapter 1, Date Unknown, pp. 1-16.

Sutterfield, Large-Scale Network Intrusion Detection, 1997, WheelGroup Corporation, pp. 1-10.

Kumar et al., An Application of Pattern Matching in Intrusion Detection, Technical Report No. CSD-TR-94-013, Jun. 17, 1994, Purdue University, pp. 1-55.

Huang et al., A Large-Scale Distributed Intrusion Detection Framework Based on Attack Strategy Analysis, Date Unknown, The Boeing Company, pp. 1-12.
Perrochon et al., Event Mining with Event Processing Networks, Date Unknown, Stanford University, pp. 1-4.
Gruschke, Integrated Event Management: Event Correlation Using Dependency Graphs, presented at DSOM 1998, University of Munich, pp. 1-12.
Bass, Intrusion Detection System and Multisensor Data Fusion, Apr. 2000, Communications of the ACM, vol. 43, No. 4, pp. 99-105.
Bass et al., A Glimpse into the Future of ID, Date Unknown, Usenix, pp. 1-10.
LaPadula, State of the Art in Anomaly Detection and Reaction, Jul. 1999, Mitre Corporation, pp. 1-36.
Rationalizing Security Events with Three Dimensions of Correlation, Date Unknown, NetForensics, Tech Brief, pp. 1-6.
Jou et al., Design and Implementation of a Scalable Intrusion Detection System for the Protection of Network Infrastructure, Date Unknown, MCNC, pp. 1-15.
Caldwell, Event Correlation: Security's Holy Grail?, Aug. 1, 2002, GuardedNet, pp. 1-21.
Metcalf et al., Intrusion Detection System Requirements, Sep. 2000, Mitre Corporation, pp. 1-33.
Jou et al., Architecture Design of a Scalable Intrusion Detection System for the Emerging Network Infrastructure, Technical Report CDRL A005, Apr. 1997, MCNC, pp. 1-42.
Security Manager for UNIX Systems Version 3.2.1 User's Guide, Feb. 1998, Internet Security Systems, pp. 1-162.
RealSecure Release 1.2 for UNIX A User Guide and Reference Manual, 1997, Internet Security Systems, Inc., pp. 1-92.
Internet Scanner SAFE SAFEsuite 4.0 User Guide and Reference Manual, 1996, Internet Security Systems, Inc., pp. 1-158.
Internet Scanner 3.3 User Guide and Reference Manual, 1996, Internet Security Systems, Inc., pp. 1-119.
Landwehr et al., Newsletter of the IEEE Computer Society's TC on Security and Privacy Electronics, Electronic CIPHER, Nov. 25, 1997, Issue 25, pp. 1-34.
20th National Information Systems Security Conference, Oct. 6-10, 1997, Baltimore, Maryland, pp. 1-44.
EMERALD Alert Management Interface User's Guide Version 1.2, Dec. 6, 2000, SRI International, pp. 1-11.
Anderson et al., Detecting Unusual Program Behavior Using the Statistical Component of the Next-Generation Intrusion Detection Expert System (NIDES), May 1995, SRI International, pp. 1-89.
Lunt et al., Detecting Intruders in Computer Systems, 1993 Conference and Auditing and Computer Technology, SRI International, pp. 1-17.
Network ICE Products—ICEcap, Date Unknown, pp. 1-2.
Forlanda, The Secrets to Driving on BlackICE, Jan. 12, 2000, Network ICE, pp. 1-35.
BlackICE User's Guide Version 1.0 Beta Draft, 1999, Network ICE Corporation, pp. 1-59.
ICEcap Administrator's Guide Version 1.0 Beta Draft, 1999, Network ICE Corporation, pp. 1-25.
Shulak et al., ICEcap Advanced Administration Guide Version 3.0, 2001, Internet Security Systems Corporation, pp. 1-51.
"Real Secure, OS Sensor User Guide," Version 5.0, © Internet Security Systems, Inc. 199?-2000; Sep. 2000, pp. 1-64.
"Real Secure, User's Guide," Version 3.0, © 1992-1998, Internet Security Systems, Inc., pp. 1-128.
"System Security Scanner, User Guide," Version 1.6, © 1996-1998, Internet Security Systems, Inc., pp. 1-164.
"Real Secure™, Network Engine User Guide," Version 3.2.1, © 1999 by Internet Security Systems, Inc., pp. 1-38.
"Real Secure™, User Guide," Version 3.2.1, © 1999 by Internet Security Systems, Inc., pp. 1-38.
"Real Secure™, Manager for HP OpenView User Guide," Version 1.3, © 1999 by Internet Security Systems, Inc., pp. 1-48.
"Database Scanner, User Guide," Version 2.0, © 1992-1999, Internet Security Systems, Inc., pp. 1-112.
"Database Scanner™, User Guide," Version 4.0, © 2000 by Internet Security Systems, Inc., pp. 1-122.
"Database Scanner™, User Guide," Version 3.0.1, © 1999 by Internet Security Systems, Inc., pp. 1-164.
"Real Secure™, Network Sensor User Guide," Version 5.0, © 2000 by Internet Security Systems, Inc., pp. 1-42.
"Real Secure, Server Sensor User Guide," Version 5.5, © Internet Security Systems, Inc. 2000, pp. 1-56.
"Internet Scanner™, User Guide," Version 6.0, Copyright © 1999 by Internet Security Systems, Inc., pp. 1-182.
"Internet Scanner™, User Guide," Version 6.1, © 2000 by Internet Security Systems, Inc., pp. 1-226.
"Internet Scanner™, User Guide," Version 5.6, © 1992-1998, Internet Security Systems, Inc., pp. 1-162.
"Internet Scanner™, User Guide," Version 5.3, © 1992-1998, Internet Security Systems, Inc. pp. 1-173.
"Real Secure, Console User Guide," Version 5.5, © 199?-2000, Internet Security Systems, Inc., pp. 1-162.
"Internet Scanner™, User Guide," Version 5.8, © 1999 by Internet Security Systems, Inc., pp. 1-148.
"SAFEsuite Decisions, User Guide," Version 1.0, © 1992-1998, Internet Security Systems, Inc., pp. 1-88.
"Real Secure™, Console User Guide," Version 5.0, © 2000 by Internet Security Systems, Inc., pp. 1-114.
"SAFEsuite Decisions, User Guide," Version 2.5, © 2000 by Internet Security Systems, Inc., pp. 1-194.
"System Scanner, User Guide," Version 1.7, © 1992-1998, Internet Security Systems, Inc., pp. 1-248.
"Sytem Scanner, User Guide," Version 1.0, © 1996-1998, Internet Security Systems, Inc., pp. 1-140.
"System Scanner™, User Guide," Version 4.0, © 1999 by Internet Security Systems, Inc., pp. 1-178.
Internet Security Systems, Inc., "Introduction to RealSecure Version 5.0, The Industry's Only Integrated Host-Based and Network-Based Intrusion Detection System", Aug. 22, 2000, pp. 1-47.
Internet Security Systems, Inc., "RealSecure Network Sensor and Gigabit Network Sensor Policy Guide Version 7.0", Aug. 2003, pp. 1-86.
Internet Security Systems, Inc., "RealSecure Console User Guide Version 3.1", Jun. 1999, pp. 1-98.
Internet Security Systems, Inc., "RealSecure Version 2.0", Apr. 1998, pp. 1-154.
Internet Security Systems, Inc., "Enhanced Dynamic Threat Protection via Automated Correlation and Analysis", an ISS White Paper, 2002, pp. 1-14.
Internet Security Systems, Inc., "RealSecure Site Protector Comparison Guide for Internet Scanner 7.0 Reporting Version 1.2", Mar. 2003, an ISS Tech Note, pp. 1-15.
Internet Security System, Inc., "RealSecure Site Protector Comparison Guide for ICEcap Manager Version 1.5", Jan. 2002, an ISS Technical White Paper, pp. 1-27.
Internet Security Systems, Inc., "RealSecure SiteProtector Security Fusion Module 2.0 Frequently Asked Questions", Mar. 2003, pp. 1-8.
Internet Security Systems, Inc., "RealSecure SiteProtector Console User Reference Guide Version 2.0 Service Pack 1", Mar. 14, 2003, Chapter 3, pp. 1-27.
Internet Security Systems, Inc., "Proventia Gateway and Network Protection", Jul. 2003, pp. 1-12.
Farley, Internet Security System, Inc., "ID Fusion Technology, A First-Generation Approach", Apr. 29, 1999, National Security Framework Forum, pp. 1-8.
Farley, "RealSecure Fusion Engine Concepts", an ISS White Paper, Jun. 30, 1999, pp. 1-23.

* cited by examiner

| INTRUSION EVENT IDENTIFIER | SCANNER VULNERABLITY EXPLOIT(S) | VULNERABILITY ANALYSIS ACTION |
|---|---|---|
| BACKORIFICE | BACKORIFICE | RUN COMMAND LINE SCAN (BACKORIFICE POLICY; TARGET ADDRESS; TARGET PORT) |
| HTTP: IIS$$DATA | DATA BUG | RUN COMMAND LINE SCAN (DATA BY POLICY; TARGET ADDRESS) |

FIG. 6

| OPERATING SYSTEM | SERVICE | EXPLOIT |
| --- | --- | --- |
| WINDOWS | -- | BACKORIFICE<br>BACKORIFICE 2000<br>EVILFTP_BACKDOOR<br>NETBUS<br>NETBUS_PRO<br>SUBSEVEN_SCAN<br>SMB_PASSWORD_OVERFLOW<br>WINDOWS_PWL_ACCESS<br>WINDOWS_REGISTRY_READ |
| -- | FTP | FTP_ARGS<br>FTS_BOUNCE<br>FTP_MKDIR<br>FTP_PRIVILEGEDBOUNCE<br>FTP_PRIVILEGEDPORT<br>FTP_ROOT<br>FTP_SITE_EXEC_DOTDOT<br>FTP_SITE_EXEC_TAS |

*FIG. 8*

METHOD AND SYSTEM FOR INTRUSION DETECTION IN A COMPUTER NETWORK

TECHNICAL FIELD

The present invention is generally directed to the detection of an intrusion event in a computer network. More particularly described, the present invention provides an integration of intrusion detection and vulnerability assessment functions for determining the priority of an alert in response to detection of an intrusion event in a computer network.

BACKGROUND OF THE INVENTION

In an open network, data messages from one computer to another computer may be intercepted and data obtained from that message as it is passed to another computer. The most popular open network is the global Internet, where literally millions of servers and computers are coupled through a Transport Control Protocol/Internet Protocol (TCP/IP) communication protocol. While the open network architecture of the Internet permits a user on a network to have access to information on many different computers, it also provides access to messages generated by a user's computer, and to resources of the user's computer. Persons typically called "hackers" exploit the open architecture of the Internet to gain access to computers without authorization. Hackers represent a significant security risk to any computer coupled to a network because a user for one computer may attempt to gain unauthorized access to resources on another networked computer. Hackers also can exploit a computer network by attempting to deny service by a target computer, thereby rendering the computer incapable of a providing normal service.

In an effort to control access to a computer network and, hence, limit unauthorized access to network resources, the computing community has developed computer security devices, intrusion detection techniques, and vulnerability assessment analyses. For example, a firewall can be used to control the transfer of data into or out of a network. An intrusion detection system can be used to provide an alert in the event that the firewall is breached (or an attempt is made to breach the firewall) by an unauthorized user of the computer network. Scanning devices can be used to evaluate the vulnerability of a computer network to a variety of intrusion events.

A typical intrusion detection process is illustrated in the logical flowchart diagram of FIG. 1. Turning now to FIG. 1, the initial task completed by a representative prior intrusion detection process 100 is monitoring of traffic carried by a computer network to detect the possible presence of a known attack signature, as shown in step 110. An intrusion event is detected in step 120 based upon the detection of network data associated with a known attack signature. In step 130, the detected intrusion of the computer network is reported in the form of an alert supplied to the user. Typically, an intrusion alert is supplied to a monitoring console, which is operated by a skilled computer security technician. In response to the intrusion alert, the computer security technician completes in step 140 a manual investigation of the alert.

For example, based upon initial investigation results, the computer security technician may alert a computer emergency response team to respond to a possible attack on the computer network. In the alternative, the computer security technician may determine that the intrusion alert represents a false attack or a false positive event. The detected intrusion represents a false alarm if the intrusion cannot harm the operation of the computer system. The technician typically classifies a detected intrusion as a false positive event if that intrusion presents valid data carried by the computer network.

A typical intrusion detection system generates an alert in response to each detection of a possible intrusion in a computer network. In today's computing environment, a conventional intrusion detection system can generate multiple alerts each day for certain computing environments, such as a popular commercial web site or a "secure" network operated by a governmental agency, military entity or commercial enterprise. Each alert must be manually investigated by a skilled security technician to determine whether the alert represents an actual harmful attack on the computer network. In the absence of a vulnerability assessment of the target, a skilled security staff must complete a labor intensive review of one or more detected intrusion events to determine whether the alert represents an actual attack, a false alarm or a false positive event. Security staff may be hard pressed to complete a timely response to a scenario involving multiple intrusion alerts over a short time period in view of the manual nature of the investigation task. The assessment of computer network vulnerability in response to an intrusion alert is often further complicated by a lack of complete archival records that describe prior trends in detected intrusions of the computer network. Consequently, there is a need for an intrusion detection system that can determine the severity of an intrusion and to classify and record the alert in a real time or near real time operating environment.

Computer network environments are subject to constant changes of both hardware and software components. For example, new network components can be installed or existing components can be removed in a typical corporate network environment. Likewise, new computing services can be installed or removed from the computing environment and upgrades to the computing environment can add one or more new applications. System, network, and security administrators are often challenged to keep-up with the speed at which changes arise in the conventional computer network. Changes in the computer network, however, can affect intrusion detection policies maintained by the computer security team because an assessment of the vulnerability of a computer network to an attack is dependent upon up-to-date knowledge of the current network configuration. A rapidly changing computer network can force the security team completing a manual investigation of an intrusion alert to rely upon out-of-date configuration information about the attack's target. Consequently, there is a need to efficiently create and maintain an up-to-date intrusion detection policy based upon up-to-date knowledge of the present configuration of a computer network.

In view of the foregoing, there is a need for an intrusion detection system that can adequately discern the severity of an intrusion event in a computer network. Moreover, there is a need for an intrusion detection system that can maintain a intrusion detection policy that is consistent with the current configuration of computer network components and services. The present invention solves these problems over the prior art by combining intrusion detection with vulnerability assessment functions to assist evaluation of the vulnerability of a computing network to a detected intrusion.

SUMMARY OF THE INVENTION

The present invention is directed to an improved intrusion detection system for detecting intrusion events in a computer network and assessing the vulnerability of the network components to the detected events. The intrusion detection system comprises a scanner, one or more sensors and a security console for operation within a networked computing environment. A sensor of the inventive intrusion detection system can monitor the networked computing environment for possible intrusion events representing an unauthorized access or use of the network resources. In response to detecting an intrusion event, the sensor can generate a scan request for handling by a scanner. This request initiates a scan of the target computer by the scanner to determine the vulnerability of the target to the attack. Based on this vulnerability analysis, the inventive intrusion detection system can evaluate the severity of the detected intrusion event and issue an alert having a priority corresponding to the severity of the intrusion.

The inventive intrusion detection system also can use the scanner to complete scans of the components of the computer network to characterize the present resource configuration of the networked computing environment. Based upon the results of a sweep, an updated intrusion policy can be created and maintained for use by one or more sensors of the intrusion detection system. The present invention can exchange and correlate information between intrusion detection and vulnerability assessment functions for a combination of a scanner and sensors.

Generally described, the present invention can generate an advisory about an intrusion event in a computer network. A sensor typically monitors traffic in the form of data packets carried by the computer network for a possible intrusion event. In response to detecting an intrusion event, the sensor determines whether the intrusion event represents a qualified intrusion event having a known characteristic associated with a recognized attack and a detectable target vulnerability. If so, the sensor issues to a scanner a request to complete a scan of the computer network. For a network target, the scanner completes a scan operation to evaluating whether the network target is vulnerable to the detected intrusion event. If the target is vulnerable to that event, then the scanner (or the sensor) can transmit an advisory to a security console. This advisory is assigned a ranking based on the vulnerability of the network target. This advisory is presented by the security console to a security technician to prompt an action appropriate with the ranking assigned to the advisory. For example, a high priority alert typically requires immediate attention and represents an actual attack on a target computer that is vulnerable to that attack. In contrast, an alert assigned a low priority indicates a less urgent response, such as logging the alert for archival purposes or future review.

For another aspect of the invention, a network security system comprises one or more sensors, a scanner, and a security console. Each sensor, coupled to the computer network, monitors data packets carried by the computer network for a possible intrusion event. A sensor can transmit to the scanner a scan request in response to determining that a detected intrusion event represents a qualified intrusion event having a known characteristic associated with a recognized attack and a detectable target vulnerability. The scanner, which is coupled to the computer network and the sensor, can respond to the scan request by evaluating whether a network target is vulnerable to the detected intrusion event. The scanner (or the sensor) is further operative to issue an advisory having a ranking based on the vulnerability of the network target. The security console, which is coupled to the sensor and to the scanner, can present the advisory to a security technician. The ranking for the advisory, such as high, medium or low priority, defines the action to be taken in response to presentation of the advisory.

These and other advantages of the present invention will be understood based upon a review of the drawing set, the following detailed description and the attached claims defining the invention.

BRIEF DESCRIPTION OF THE DRAWINGS

FIG. 6 is a table illustrating the mapping of network intrusion events to scanner vulnerability exploits to define an appropriate vulnerability analysis action in accordance with an exemplary embodiment of the present invention.

FIG. 8 is a table illustrating the mapping of computing components, such as operating systems and services, to exploits to define an intrusion detection policy in accordance with an exemplary embodiment of the present invention.

DETAILED DESCRIPTION OF THE EXEMPLARY EMBODIMENTS

Figure 1:
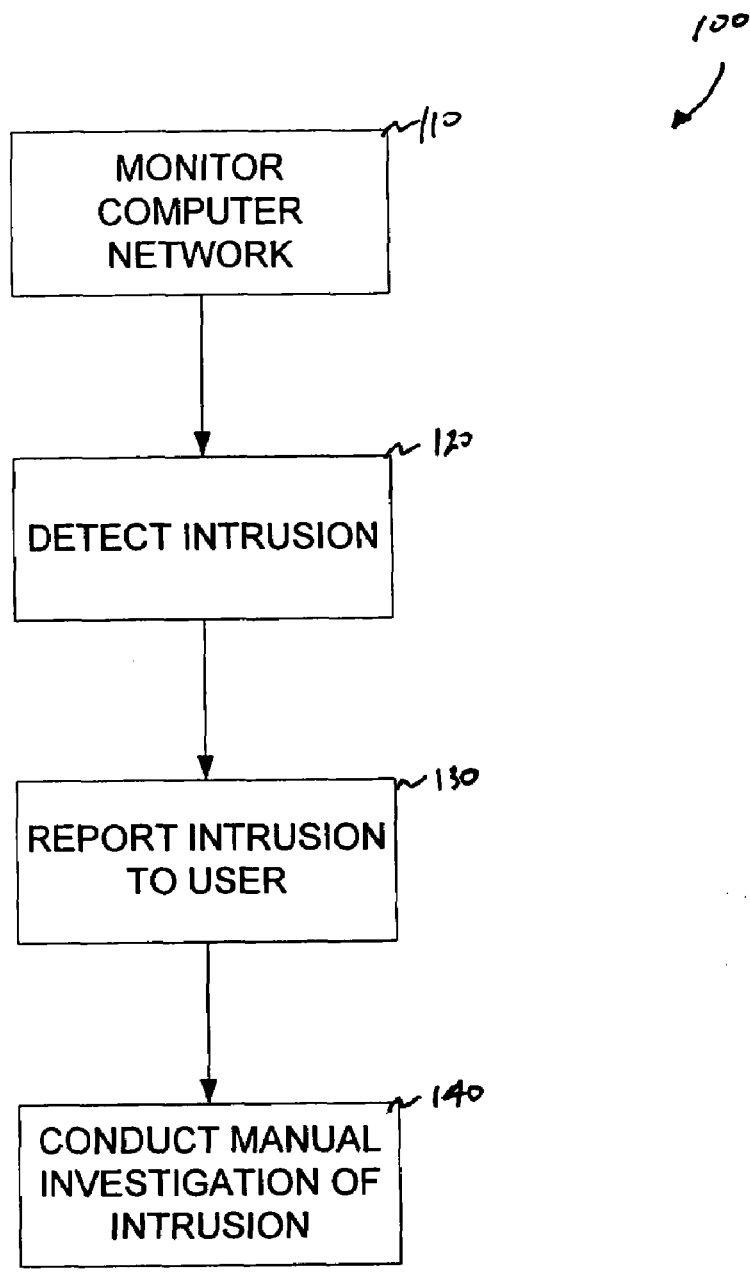
FIG. 1 is a logical flowchart diagram illustrating a prior process for detecting and evaluating an intrusion of a computer network.

A conventional intrusion detection system, while a valuable network security tool, lacks the ability to adequately evaluate the severity of an intrusion event or to maintain an up-to-date intrusion policy consistent with the changing computer network environment. Consequently, there is a need to correlate information about a detected intrusion event to corresponding vulnerability information about the targeted computer component. The present invention solves this problem of prior intrusion detection systems by combining intrusion detection and vulnerability analysis functions to form an integrated or "smart" intrusion detection system.

A sensor of the inventive intrusion detection system can detect an intrusion event and, in response, issue a request for a scan of the attacked system to determine the vulnerability of network components to the attack. Based on this vulnerability analysis, the inventive intrusion detection system can evaluate the severity of the detected intrusion event and issue an alert having a priority corresponding to the severity of the intrusion. Moreover, the inventive detection system can complete scans of the components of the computer network to characterize the present network environment. Based upon the results of a sweep, an updated intrusion policy can be created and maintained for use by one or more sensors of the intrusion detection system. In this manner, the present invention can exchange and correlate information between intrusion detection and vulnerability assessment functions.

Turning now to the drawings, in which like numerals represent like elements, FIGS. 2-8 illustrate the architecture and processes for exemplary embodiments of the present invention. As shown in the exemplary operating environment in FIG. 2, a computer network includes an intrusion detection system 200 and a communications link extending between the Internet 205 and an Intranet 210. The Internet 205 and the Intranet 210 represent examples of distributed computer networks characterized by an open network architecture. A firewall 215 separates the external computing environment, represented by the Internet 205, from the internal computing environment associated with the Intranet 210. To supplement the security feature of the firewall 215, the intrusion detection system 200, comprising a scanner 220, one or more network sensors 225, and a security console 230, operates within the internal computing environment associated with the Intranet 210. One or more computer components, typically servers 235 comprising Web or electronic mail servers, are also connected to the Intranet 210 and operate behind the firewall 215.

Figure 2:
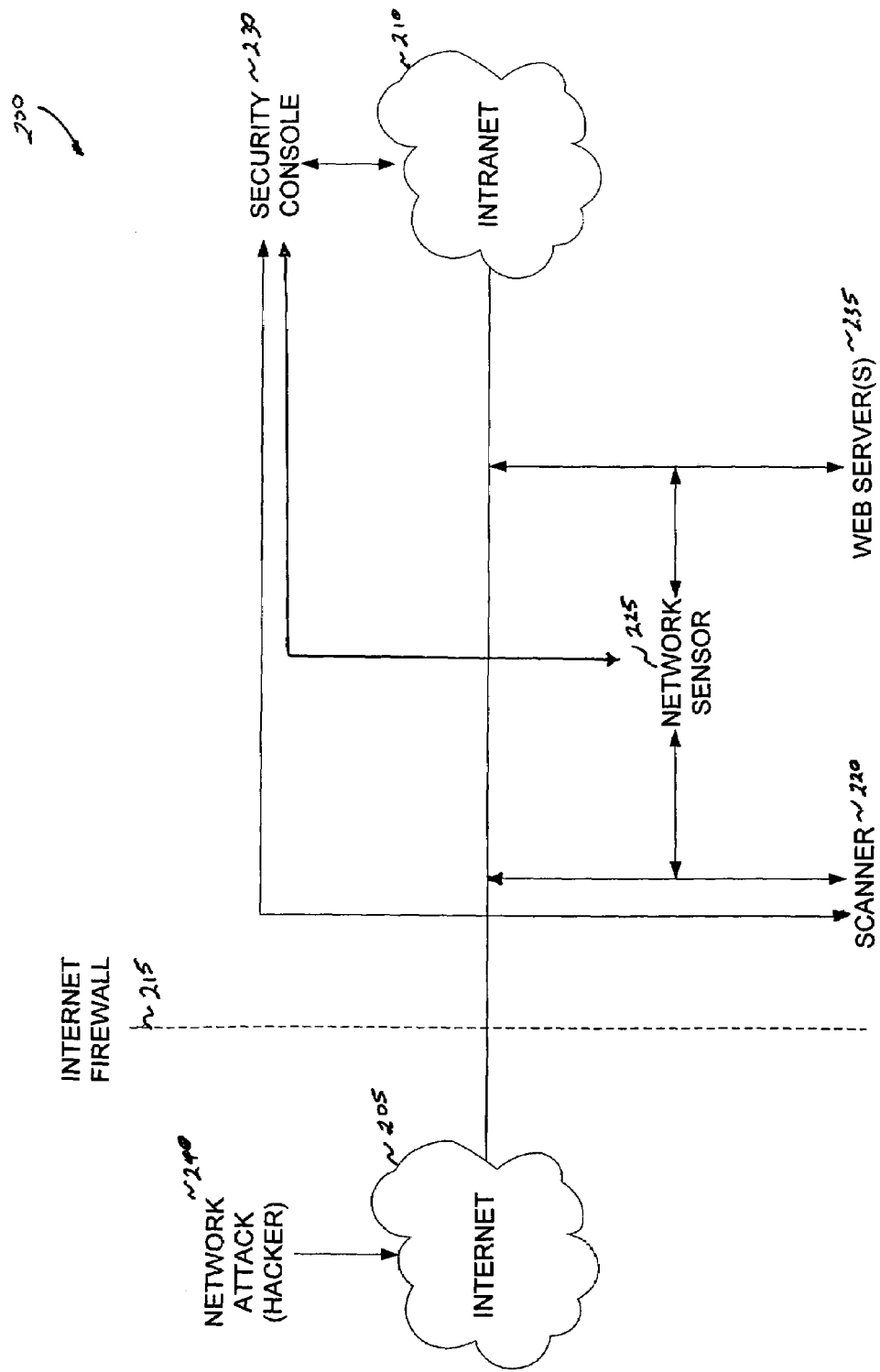
FIG. 2 is a block diagram illustrating the operating environment for an exemplary embodiment of the present invention.

The scanner 220, which is coupled to the network sensors 225 and to the security console 230, can scan the internal computing environment operating behind the firewall 215 to evaluate the vulnerability of computer network components to one or more intrusion events. The sensor 225 is coupled to the servers 235 to monitor network traffic for intrusion events that may affect the proper operation of the servers. In response to detection of an intrusion event, the sensor 225 will initiate an evaluation of the severity of the event. Although the illustration shown in FIG. 2 represents a single network sensor 225, it will be understood that multiple sensors can be used to monitor intrusion events associated with traffic carried by the Intranet 210. In particular, the sensor 225 will request that the scanner 220 complete a scan of one or more computing components or services that are subjected to the intrusion event. This scan operation supports an assessment of the vulnerability of such computing components and services to the intrusion event. Based upon the vulnerability assessment completed by the scanner 220, an alarm can be issued to the security console 230. This alarm can include a priority ranking upon the severity of the detected intrusion event. For example, an alarm can be assigned a high, medium, or low priority as a result of a corresponding vulnerability assessment.

Both the firewall 215 and the inventive intrusion detection system operate in tandem to support the computer network security operations in view of a potential network attack by an unauthorized user 240, such as a hacker, via the Internet 205. For example, a BackOrifice attack can be launched by a hacker 240 against a server 235 running Microsoft Corporation's "WINDOWS" operating system. In response to detection of this intrusion event by the network sensor 225, the scanner 220 completes a scan of the target server. This scan supports an assessment of the vulnerability of the target server to the BackOrifice attack. If the assessment returns a vulnerability of the target to the BackOrifice attack, then a determination is made that the BackOrifice attack is likely to succeed against the target, namely a server operating the "WINDOWS" operating system. For this scenario, the scanner 220 issues an alert having a high priority to the security console 230. In turn, the operator at the security console 230 can respond to the high priority alert by configuring the firewall 215 to block all traffic from the Internet Protocol (IP) address of the hacker's machine 240. On the other hand, if the assessment does not find that the target is vulnerable to the BackOrifice attack, a lower priority alert is issued by the scanner 220 to the security console 230.

The scanner 220 also can conduct scan operations to identify the components and services associated with the Intranet 210. In the event that the scanner 220 determines a change in the operating environment of the Intranet 210, the scanner supports an update of the intrusion detection policy to reflect the current configuration of components and services for the internal computing environment. This new intrusion detection policy can be applied to each sensor 225. The scan operation conducted by the scanner 220 can be conducted on a continuous basis or predetermined or random schedules. In this manner, the exemplary intrusion detection system 200 can complete a sweep of the protected computing segment and can create a customer policy for intrusion detection based on the sweep results.

The exemplary intrusion detection system 200 illustrated in FIG. 2 provides a significant advantage over the prior art by effectively reducing the total cost of ownership for a secure computing environment. For example, the exemplary intrusion detection system can reduce the amount of time spent by a console operator or a security team to investigate detected intrusion events because only those events assigned high priority may require a responsive action. For example, low and medium priority alerts may be tracked or otherwise documented in an archival log without requiring substantial investigative activity by the console operator. This reduces the amount of operator activity necessary for managing a security system for a computer network. In this manner, the intrusion detection system can filter a flood of alerts arising from the detection of multiple intrusion events by presenting the most critical alert information to the security operator in a quickly recognizable format. For example, the intrusion detection system can assign high priority to an alert for a detected intrusion event only if a vulnerability exists in the target machine.

Figure 3:
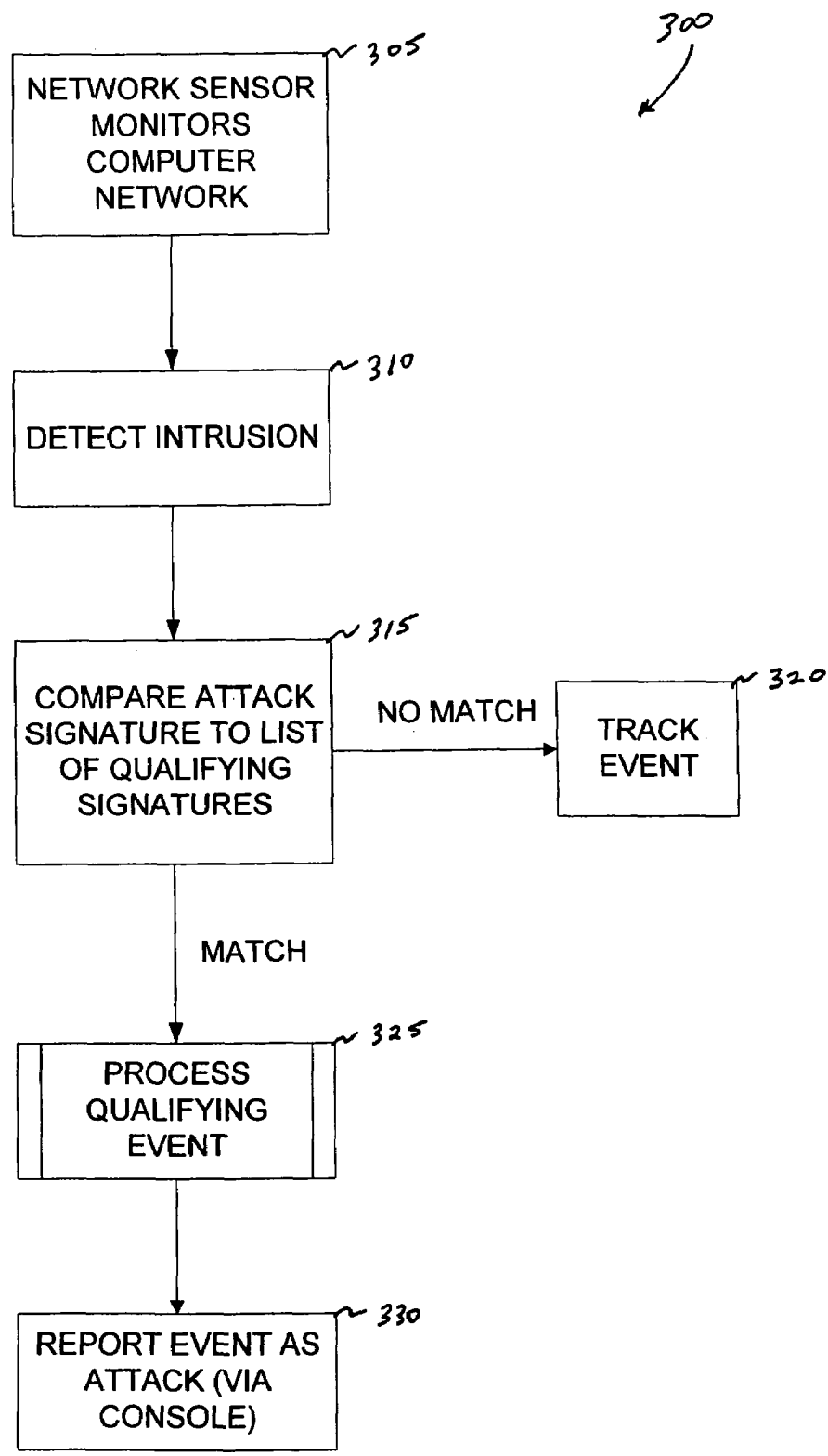
FIG. 3 is a logical flowchart diagram illustrating a process for detecting an intrusion of a computer network in accordance with an exemplary embodiment of the present invention.

FIG. 3 is a logical flowchart diagram illustrating an exemplary process for intrusion detection in a computing environment comprising one or more sensors and a scanner. The exemplary intrusion detection process 300 is initiated in step 305 by using one or more sensors to monitor traffic carried by a conventional computer network having components and services. In step 310, an intrusion event is detected by a network sensor.

The network sensor conducts a comparison operation in step 315 by comparing the attack signature to a list of qualifying signatures. The qualifying signatures represent intrusion events having known characteristics associated with a recognized attack and a detectable target vulnerability. If this comparison task does not result in a match in step 315, a response to the intrusion event is defined by a predetermined configuration for the intrusion detection system. For example, the detected intrusion event can be tracked by creating a corresponding log entry for future reference. If, on the other hand, the attack signature matches a qualifying signature, the detected intrusion event is processed as a qualifying event in step 325.

The processing task completed in step 325 will result in the assignment of a priority ranking to an alert that will be generated in response to the detected intrusion event. For example, the alert can be assigned a high, medium, or low priority. This priority ranking is generated in response to a vulnerability assessment of the target computer that is the subject of the detected intrusion event. In turn, the detected intrusion event is reported as an attack via the console. The operator at the console can respond to the attack by taking one or more actions commensurate with the priority assigned to the attack alert.

Figure 4:
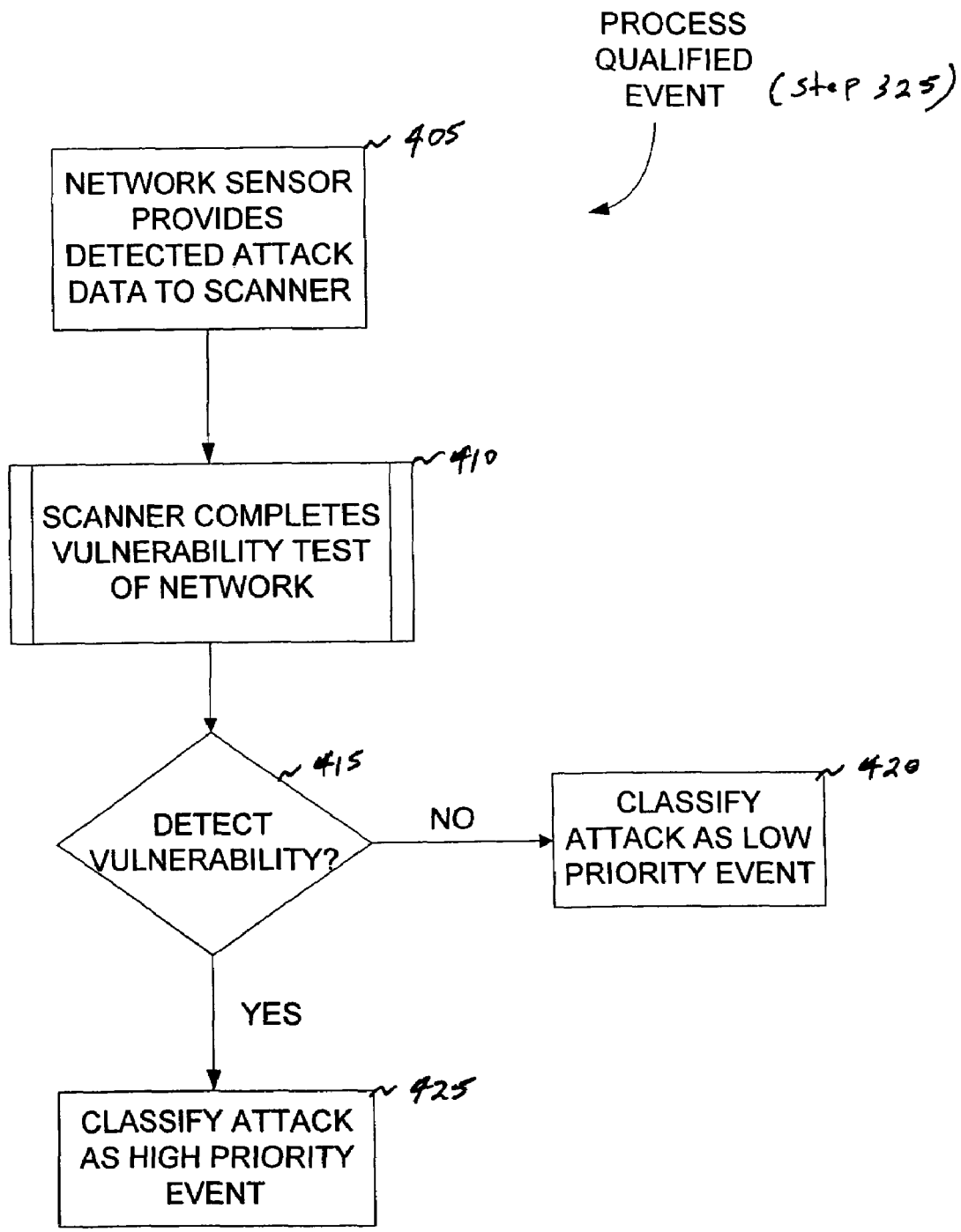
FIG. 4 is a logical flowchart diagram illustrating a process for evaluating a qualified security event associated with a detected intrusion in accordance with an exemplary embodiment of the present invention.

FIG. 4 is a logical flowchart diagram illustrating an exemplary process for processing the qualifying intrusion event based upon the match of an attack signature with qualifying signatures maintained by the network sensor. This exemplary process, which is shown in step 325 of FIG. 3, is further described in the logical flowchart diagram of FIG. 4. Turning now to FIG. 4, a network sensor in step 405 provides to a scanner attack data resulting from the detected intrusion event. In response to the attack data, the scanner completes a vulnerability test of the computer network in step 410. Because the attack data can provide an indication of the computer components or services that represent the subject of an attack, the scanner may focus the vulnerability test on such identified network items. The scanner typically completes the vulnerability test by "replaying" the attack based upon a scan of network components. This enables the scanner to determine whether the detected attack was successful based upon an assessment of vulnerability of the network items to such an attack.

Typical attack data associated with a detected intrusion event include the address of the source machine, the address of the target machine, the target TCP/IP port, and the intrusion event type, including signature characteristics. Based on this attack data, the scanner can "test" the target computer by replaying the attack against the target's address and TCP/IP port to determine the vulnerability of the target to the attack. In the event that a target's component (or service) is "listening" to that address/port combination, then the scanner will determine that a high probability exists that the attack on that network item was successful. In the alternative, a "test" can be completed by using means other than an actual attack completion to evaluate the vulnerability of the target to the attack. For example, it would be undesirable to test a target's vulnerability of a Denial of Service attack by actually completing a Denial of Service-type test against the target.

In decision step 415, an inquiry is conducted to determine whether each network item is vulnerable to an attack based upon the results of the vulnerability test completed in step 410. If the response to this inquiry is negative, the "NO" branch is followed to step 420. The scanner classifies the attack as a low priority (or medium priority) event in step 420. If a vulnerability is detected in step 415, the "YES" branch is followed to step 425. In step 425, the scanner classifies the attack as a high priority event.

Figure 5:
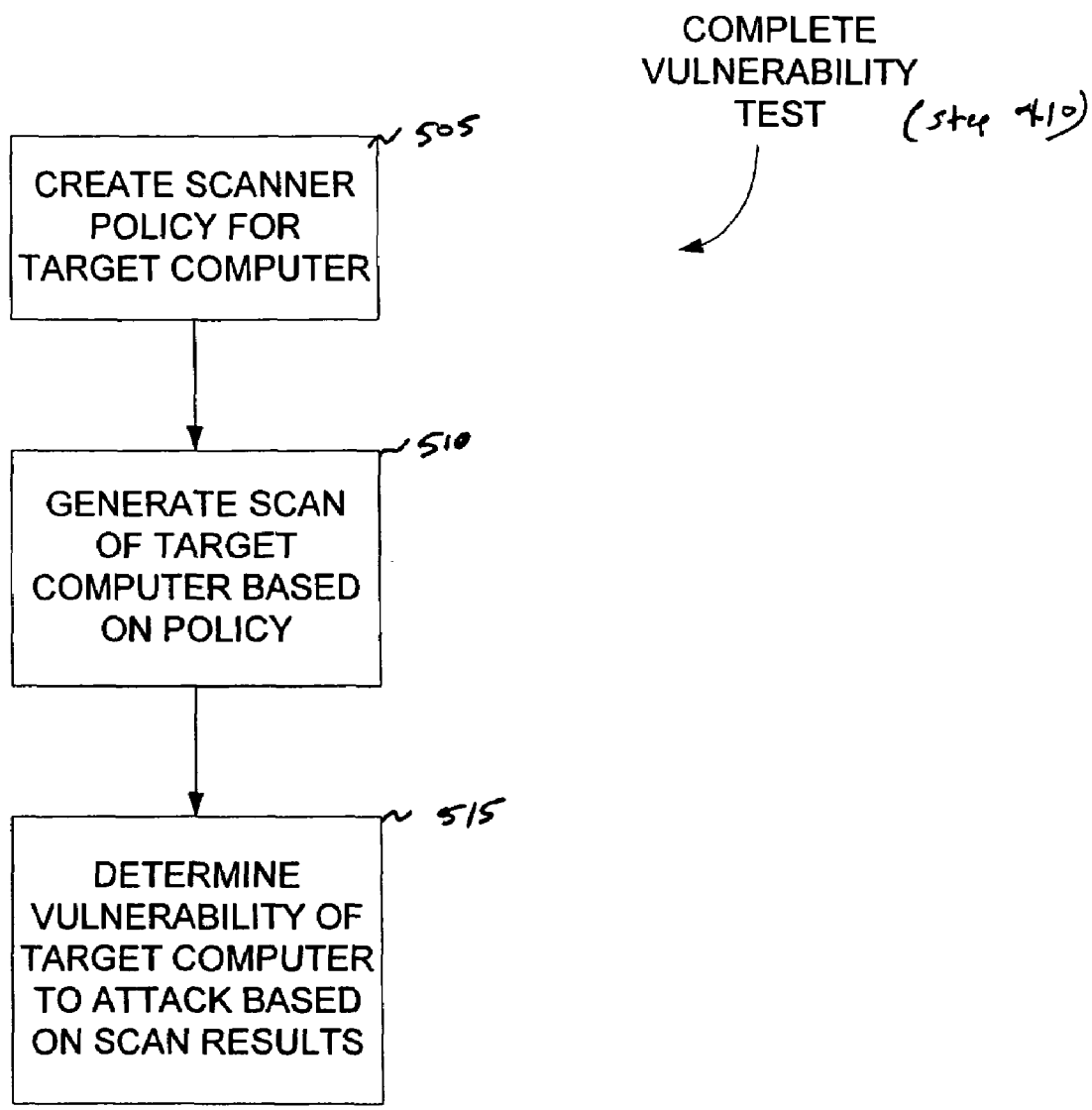
FIG. 5 is a logical flowchart diagram illustrating a process for evaluating the vulnerability of the target computer to a detected intrusion in accordance with an exemplary embodiment of the present invention.

FIG. 5 is a logical flowchart diagram illustrating an exemplary process for completing a vulnerability test. FIG. 5 provides a detailed illustration of the task completed by step 410 of FIG. 4 to complete the vulnerability test of a computer network. Turning now to FIG. 5, a scanner policy for a target computer is created in step 505. The scanner policy defines the vulnerability to be tested, the target address, and the target TCP/IP port.

In step 510, the scanner generates a scan of the target computer based upon the scan policy. For example, for the "INTERNET SCANNER" product marketed by Internet Security Systems of Atlanta, Ga., the scan is issued by running a "command line" scan against the target computer.

In step 515, the scanner determines the vulnerability of the target computer to the attack based upon the scan results. A representative system for detecting and identifying security vulnerabilities in an open network computer system is described in U.S. Pat. No. 5,892,903. The '903, which is assigned to the assignee for the present application, is fully incorporated herein by reference.

For a representative example involving the INTERNET SCANNER device marketed by Internet Security Systems of Atlanta, Ga., a sensor detects a BackOrifice attack and issues a request that the scanner complete a corresponding scan of the target computer. A new scanner policy for the INTERNET SCANNER device can be created based on the characteristics "blank" and "BackOrifice." The scan is completed by running a command-line scan having the values "newly created policy," "target address" and "target port." The output or results of the scan are analyzed to determine whether the target computer is vulnerable to the BackOrifice attack. In other words, at the completion of a BackOrifice-type scan, the scanner has information describing the vulnerability of the target computer to the BackOrifice attack. This enables the scanner (or the sensor) to assign a priority rating to an alert based on the corresponding vulnerability assessment for the target computer. For example, if the target computer is vulnerable to the BackOrifice attack, then a high priority alert is transmitted to the security console from either the scanner or the sensor. If, on the other hand, the target computer is not vulnerable to the BackOrifice attack, then the scanner or the sensor issues a medium priority alert. The high priority alert provides an indication for the need to take immediate action to address the attack, while the medium priority alert suggests a less urgent response, such as logging the alert for future consideration.

For another representative example involving ISS's INTERNET SCANNER device, a sensor detects an HTTP: IIS$DATA attack and issues a request that the scanner complete a corresponding scan of the target computer. A new scanner policy for the INTERNET SCANNER device can be created based on the characteristics "blank" and "DATA bug." The scan is completed by running a command-line scan having the values "newly created policy" and "target address." The output of the scan are analyzed to determine whether the target computer is vulnerable to the HTTP:IIS$DATA attack. In turn, the scanner (or the sensor) assigns a priority rating to an alert based on the corresponding vulnerability assessment for the target computer. If the target computer is vulnerable to the HTTP:IIS$DATA attack, then a high priority alert is transmitted to the security console. If the target computer is not vulnerable, then the scanner or sensor issues a low priority alert for receipt by the security console. In contrast to an alert assigned a high priority, an alert assigned a low priority indicates a less urgent response, such as logging the alert for archival purposes or future review.

For yet another representative example involving ISS's INTERNET SCANNER device, a sensor detects a "Smurf" attack and issues a request that the scanner complete a corresponding scan of the target computer. In response, the scanner transmits a single ping packet to the target computer. If the target computer responds to the ping by issuing a ping reply, then the scanner (or the sensor) can issue to the security console an alert assigned a low priority. If, on the other hand, the ping of the target computer does not result in a ping reply, then another ping packet is transmitted to the target computer. If the target computer now responds to the ping packet by issuing a reply, then the scanner (or the sensor) issues an alert having a low priority. In the absence of receiving a reply to the extra ping packet, an alert is issued having a high priority. A high priority alert typically requires immediate attention and represents an actual attack on a target computer that is vulnerable to that attack. In contrast, an alert assigned a low priority indicates a less urgent response, such as logging the alert for archival purposes or future review.

Table I provides a listing of qualified attack signatures by category and vulnerability assessment method and assigns the priority to the responding advisory or alert.

TABLE I

| Signature family | Vulnerability assessment method | High alert | Medium alert | Low alert |
|---|---|---|---|---|
| Backdoors | Verify if the target:port combination is listening | Target:port is listening | Not listening | Never |
| Denial of Service | For most DoS attacks, verify if host responds to a single ping. In case ICMP is not allowed, use portscan | Target is not responding to ping or portscan | Never | Host is responding |
| All trin00 and tfn alerts. | Scan target to determine if there are DDoS listeners | DDoS listeners detected | DDoS listeners not detected | Never |
| DNS | For hostname overflow attack, probe target using S2 and/or RS agent, determine access breach from source | Access breached | Never | No breach |
| Email | Overflow attacks: see DNS approach, Others (in general) verify version of sendmail on target | Access breached, others: if old sendmail detected | Never | All other cases |
| Finger | Verify 'finger' daemon active | Fingerd found | Never | No daemon found |
| FTP | For some decodes: verify ftp daemon version (e.g. wu-ftpd 2.4.1 | Some cases where old daemon is detected | Never | All other cases |
| HTTP | Most cases: replay URL. And parse findings. | Suspicious findings after parsing data | Some cases, | All other cases |
| ICMP | Loki: search for daemon. Pingflood& ping of death: check if target is alive | Loki daemon found or host down | Loki, no daemon | All other cases |
| Ident | Check for SendMail version 8.6.9 | 8.6.9 found | Never | Not found |
| IMAP | Check for IMAP older than 4.1 beta | <=4.1. beta | Never | All other cases |
| IP | Certain signatures (sourceroute) verify host breach using S2 or System Agent | Security breached | Not breached | Never (for Sourceroute) signature. |
| IRC | IRC daemon overflow, verify version | Old version detected | Never | All other cases |
| Netbios | No automation wanted | | | |
| Nfs | Depending on decode, verify nfs version | Depending on decode, if old version found | Never | All other cases |
| NNTP | Verify server version | Old exchange or INN | Never | All other cases |
| POP | Determine pop version (overflow attacks) | Old version | Never | All other cases |
| RIP | No action required | Never | Never | Always |
| Scanners | No action required | Always | Never | Never |
| SNMP | Snmp_delete_wins: S2 verify integrity of wins database Snmp backdoors: verify snmp version | S2 detected corrupt wins DB or old snmp server found | Nevers | All other cases |
| SUNRpc | For most signatures, verify host (sun?) and version | Depending on combination of signature detected and old = Y | Nevers | All other cases |

TABLE I-continued

| Signature family | Vulnerability assessment method | High alert | Medium alert | Low alert |
|---|---|---|---|---|
| TFTP | No action required | | | |
| Unix Remote | No action required (it's either allowed or not) | | | |
| Windows | Samba: verify version Winnuke: host alive? | 'old' samba host dead | Never Never | other cases other cases |
| Other | Certain signatures: check version info, others always high (packet capturing) others: verify service (rwho) | Old versions or vulnerable service found or packet capturing detected | never | All others. |

FIG. 6 illustrates a table for mapping the combination of an intrusion event identifier and scanner vulnerability exploit(s) to a vulnerability analysis action. For example, for a BackOrifice event, the BackOrifice exploit is activated and the vulnerability analysis action is defined by "Run Command line Scan (BackOrifice Policy; Target Address; Target Port). For an HTTP:ISS$$DATA event, the DATA bug exploit is activated and vulnerability analysis action is defined by "Run Command line Scan (DATA bug Policy; Target Address). This table can be maintained in a storage medium, such as memory, for access by the intrusion detection system.

The constant change in a typical computing environment can pose a threat to the successful detection of an intrusion event. In the absence of accurate knowledge of the computing environment, an intrusion detection system may not detect an attack on the computer network. For example, if a server running the "LINUX" operating system with all default services is installed on a computer network, this new computer adds a large number of additional services on to the computer network.

Prior intrusion detection systems must be notified of the changes to a computing environment to support effective monitoring of network items for possible intrusion events. If the security administrator is unaware of a computing environment change, the intrusion detection system continues to monitor the computing environment without recognition of the addition or removal of a network item. This can pose a serious threat to the computer network because the intrusion detection system is not able to detect an intrusion event arising from a possible attack against the modified computing environment. An exemplary embodiment of the present invention addresses this problem by using the scanner to monitor the computing environment for the addition or removal of the network item. Based upon the results of a scan operation, a new intrusion detection policy can be created and applied for operation by network sensors. This exemplary method is illustrated in the logical flowchart diagram of FIG. 7.

Figure 7:
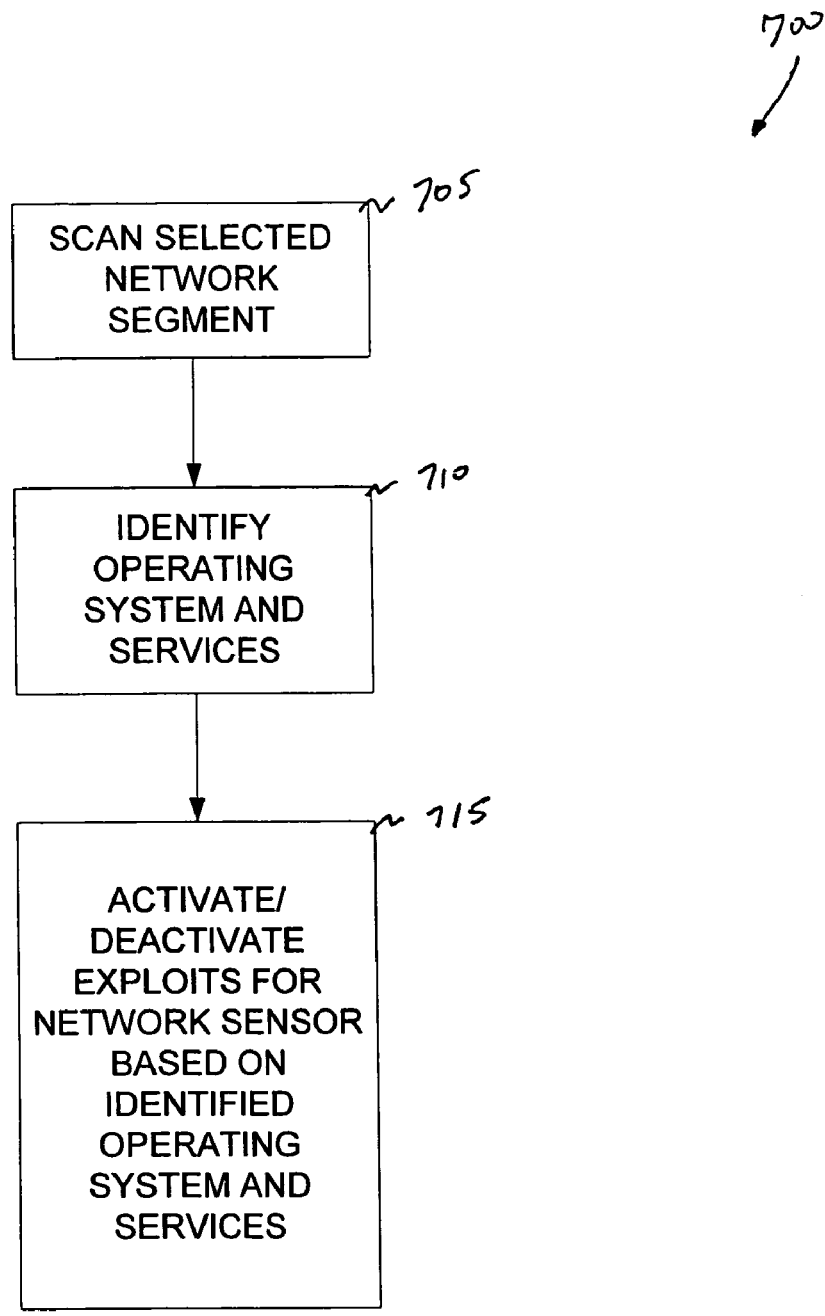
FIG. 7 is a logical flowchart diagram illustrating a process for creating an intrusion detection policy in response to the current configuration of a computing environment in accordance with an exemplary embodiment of the present invention.

Turning now to FIG. 7, an exemplary scanning process 700 is initiated in step 705 by scanning the selected item or segment of the computer network. For example, the scanner can select a particular target computer for the scan operation. The scanner can complete this scanning operation on a continuous basis or at predetermined time periods. In the alternative, the scanner can conduct a scan operation at random times in an effort to detect components or services that have been added or removed from the selected network segment. A sufficient number of scan operations should be completed on a regular basis, however, to insure the detection of change in the computing environment.

In step 710, the scanner can identify the present configuration of network component and services, including operating systems, based upon the scan of the selected network segment. Typical services include port mappers, "finger" daemons, Yellow Pages services and SMB services. Typical operating systems include the "WINDOWS", "UNIX", and "LINUX" operating systems. An exemplary system for scanning computer network and identifying the components and services of the computing environment is described in U.S. Pat. No. 5,892,903, which is fully incorporated herein by reference. For ISS's INTERNET SCANNER device, the scan of the network segment selected for protection is typically completed by running a Command Line Scan.

In step 715, exploits for the network sensor are activated (or deactivated) based upon the present configuration of the computing environment. The scanner generates an output file in response to scanning the selected network segment. For each service or operating system identified in the output file, predetermined exploits or checks are activated (or deactivated). The scanner creates a new policy file in response to this definition of activated exploits and forwards that policy to the network sensor. The security console also can receive this new policy to support its application of the policy to the network sensor.

In this manner, the monitoring operations completed by a network scanner can be updated to match the identified items of the computer network. Monitoring operations conducted by the network sensor are preferably matched to the susceptibility of the current computer network configuration to certain intrusion events. This enables the intrusion detection system to be configured and monitored for the types of intrusion events for which the current computing configuration is vulnerable.

FIG. 8 is a table illustrating a mapping between the combination of typical network items, such as operating systems and services, to vulnerability exploits. This table illustrates the specific known vulnerability exploits for intrusion events representing potential vulnerabilities of the mapped combination of operating systems and services. This table, which supports the creation of an intrusion detection policy, can be applied to a sensor of the intrusion detection system.

What is claimed is:

1. A computer-implemented process for generating an advisory about an intrusion event in a computer network, comprising the steps of:
   a. monitoring data packets carried by the computer network for a possible intrusion event;
   b. detecting an intrusion event;
   c. determining whether the detected intrusion event represents a qualified intrusion event having a known characteristic associated with a recognized attack and a detectable target vulnerability;
   d. if the detected intrusion event is a qualified intrusion event, then identifying a network target and evaluating whether the network target is vulnerable to the detected intrusion event;
   e. assigning the detected intrusion event with a ranking based on the vulnerability of the network target, wherein the advisory has the assigned ranking associated with a low priority attack event if the scan fails to identify a vulnerability of the scanned network target to the detected intrusion event; and
   f. issuing the advisory having the assigned ranking.

2. The computer-implemented process of claim 1, wherein the data packets are monitored by a sensor coupled to the computer network.

3. The computer-implemented process of claim 2 further comprising the step of issuing a command to configure a security policy for the sensor associated with the scanned portion of the computer network in response to completing the evaluation of the vulnerability of the network resource to the detected intrusion event.

4. The computer-implemented process of claim 1, wherein a scanner identifies the network target and evaluates whether the network target is vulnerable to the detected intrusion event.

5. The computer-implemented process of claim 1, wherein the advisory defines the action to be taken in response to presentation of the advisory.

6. The computer-implemented process of claim 1, wherein the advisory has the assigned ranking associated with a high priority attack event if the scan fails to identify a vulnerability of the scanned network target to the detected intrusion event.

7. The computer-implemented process of claim 1 further comprising the step of issuing a command to configure exploits for a sensor associated with the scanned network resource in response to completing an assessment of the vulnerability of the network resource to the detected intrusion event, thereby configuring a security policy for the sensor without manual intervention.

8. A computer-implemented process for generating an advisory about an intrusion event of a computer network comprising a plurality of network resources, comprising the steps of:
   a. issuing a scan request in response to determining that a detected intrusion event represents a qualified intrusion event having a known characteristic associated with a recognized attack;
   b. responsive to the scan request, completing a scan focused on at least one of the network resources that is the subject of the attack to assess the vulnerability of each scanned network resource to the attack,
   c. generating the advisory comprising information representing a correlation of information about the detected intrusion event and the corresponding vulnerability of each scanned network resource and issuing the advisory having a priority ranking associated with a low priority attack event if the scan fails to identify a vulnerability of the scanned network resource to the detected possible intrusion event.

9. The computer-implemented process of claim 8, wherein the step of generating the advisory comprises issuing the advisory having a priority ranking associated with a high priority attack event if the scan identifies a vulnerability of the scanned network resource to the detected possible intrusion event.

10. A computer-implemented process for generating an advisory about an intrusion event of a computer network comprising a plurality of network resources, comprising the steps of:
    a. issuing a scan request in response to determining that a detected intrusion event represents a qualified intrusion event having a known characteristic associated with a recognized attack;
    b. responsive to the scan request, completing a scan focused on at least one of the network resources that is the subject of the attack to assess the vulnerability of each scanned network resource to the attack,
    c. generating the advisory comprising information representing a correlation of information about the detected intrusion event and the corresponding vulnerability of each scanned network resource and issuing the advisory having a priority ranking associated with a high priority attack event if the scan identifies a vulnerability of the scanned network resource to the detected possible intrusion event.

11. The computer-implemented process of claim 10, wherein the step of generating the advisory comprises issuing the advisory having a priority ranking associated with a low priority attack event if the scan fails to identify a vulnerability of the scanned network resource to the detected possible intrusion event.

12. A computer-implemented process for generating an advisory about an intrusion event in a computer network, comprising the steps of:
    a. monitoring data packets carried by the computer network for a possible intrusion event;
    b. detecting an intrusion event;
    c. determining whether the detected intrusion event represents a qualified intrusion event having a known characteristic associated with a recognized attack and a detectable target vulnerability;
    d. if the detected intrusion event is a qualified intrusion event, then identifying a network target and evaluating whether the network target is vulnerable to the detected intrusion event;
    e. assigning the detected intrusion event with a ranking based on the vulnerability of the network target, wherein the advisory has the assigned ranking associated with a high priority attack event if the scan fails to identify a vulnerability of the scanned network target to the detected intrusion event; and
    f. issuing the advisory having the assigned ranking.

13. The computer-implemented process of claim 12, wherein the data packets are monitored by a sensor coupled to the computer network.

14. The computer-implemented process of claim 13, further comprising the step of issuing a command to configure a security policy for the sensor associated with the scanned portion of the computer network in response to completing the evaluation of the vulnerability of the network resource to the detected intrusion event.

15. The computer-implemented process of claim 12, wherein a scanner identifies the network target and evaluates whether the network target is vulnerable to the detected intrusion event.

16. The computer-implemented process of claim 12, wherein the advisory defines the action to be taken in response to presentation of the advisory.

17. The computer-implemented process of claim 12, further comprising the step of issuing a command to configure exploits for a sensor associated with the scanned network resource in response to completing an assessment of the vulnerability of the network resource to the detected intrusion event, thereby configuring a security policy for the sensor without manual intervention.

* * * * *